(12) United States Patent
Paden

(10) Patent No.: US 9,144,193 B2
(45) Date of Patent: Sep. 29, 2015

(54) CUTTING HEAD WITH SPIRAL FLAIL LINE STORAGE

(71) Applicant: Jack R. Paden, Arlington, WA (US)

(72) Inventor: Jack R. Paden, Arlington, WA (US)

( * ) Notice: Subject to any disclaimer, the term of this patent is extended or adjusted under 35 U.S.C. 154(b) by 0 days.

(21) Appl. No.: 14/165,346

(22) Filed: Jan. 27, 2014

(65) Prior Publication Data

US 2014/0137526 A1   May 22, 2014

Related U.S. Application Data

(62) Division of application No. 13/759,671, filed on Feb. 5, 2013, now Pat. No. 8,671,656.

(60) Provisional application No. 61/628,119, filed on Oct. 25, 2011, provisional application No. 61/741,101, filed on Jul. 12, 2012.

(51) Int. Cl.
*A01D 34/00* (2006.01)
*A01D 34/84* (2006.01)
*A01D 34/416* (2006.01)
*B65H 75/28* (2006.01)
*A01D 34/86* (2006.01)

(52) U.S. Cl.
CPC ............ *A01D 34/008* (2013.01); *A01D 34/416* (2013.01); *A01D 34/84* (2013.01); *A01D 34/86* (2013.01); *B65H 75/28* (2013.01)

(58) Field of Classification Search
CPC combination set(s) only.
See application file for complete search history.

(56) References Cited

U.S. PATENT DOCUMENTS 4,138,810 A * 2/1979 Pittinger et al. ................. 30/276

FOREIGN PATENT DOCUMENTS

DE     102007007987 A1 * 8/2008
FR          2995501 A1 * 3/2014

\* cited by examiner

*Primary Examiner* — Alicia Torres

(57) ABSTRACT

An adverse terrain vegetation cutting apparatus articulates to conform to adverse surface conditions. Upon detecting instability the apparatus may automatically rotate to a more stable position. The apparatus includes a spiral flail line storage head.

9 Claims, 33 Drawing Sheets

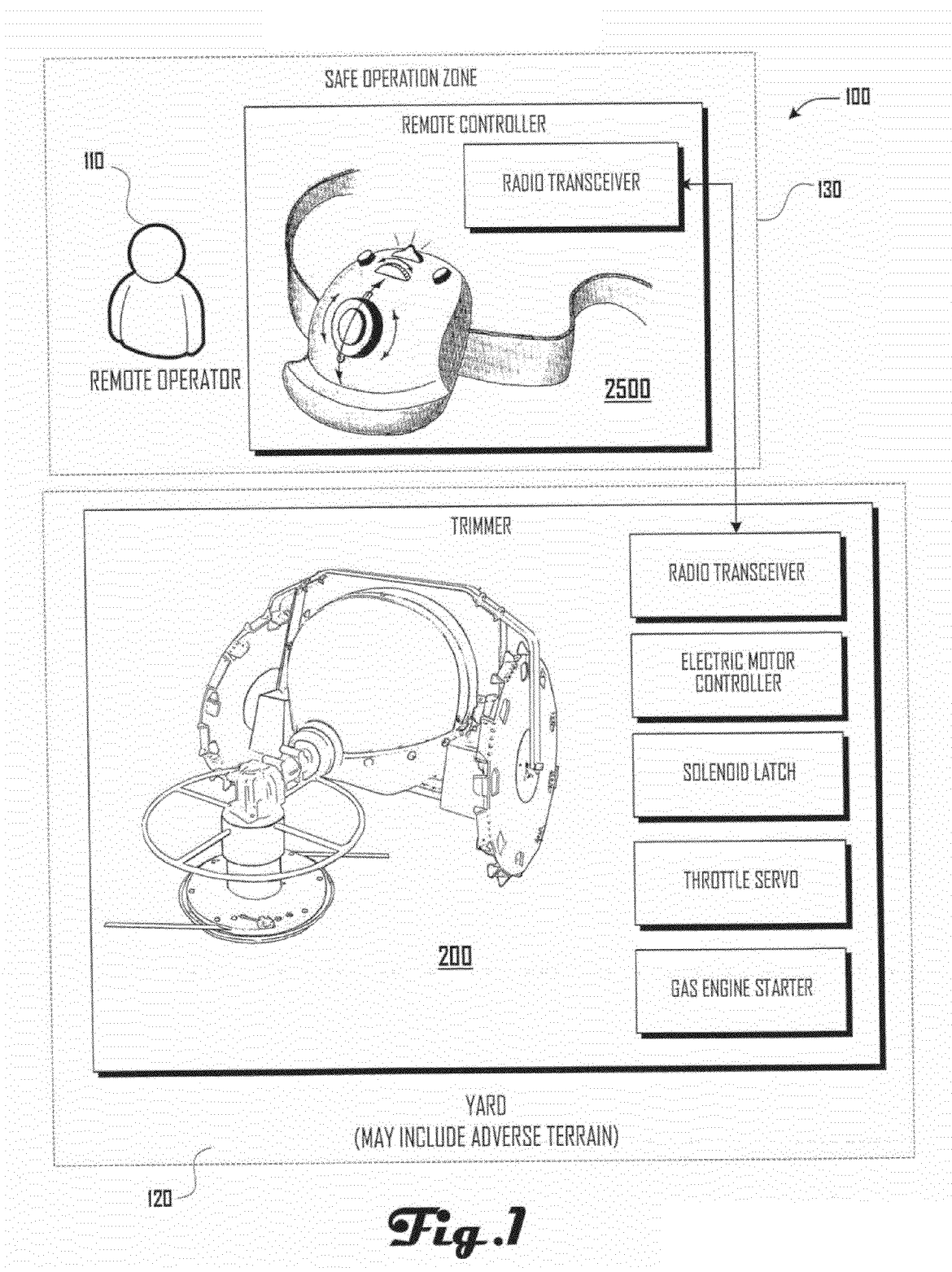

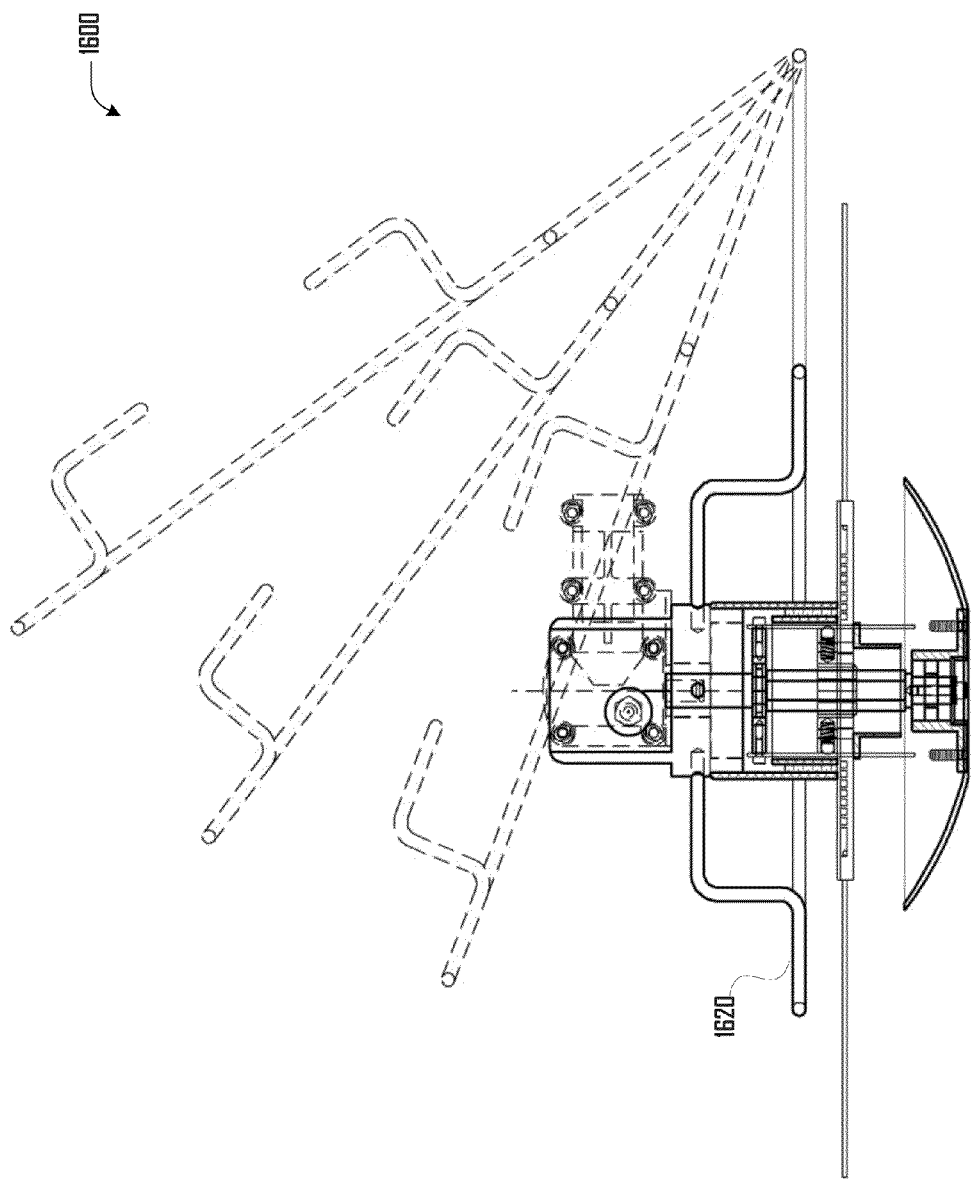

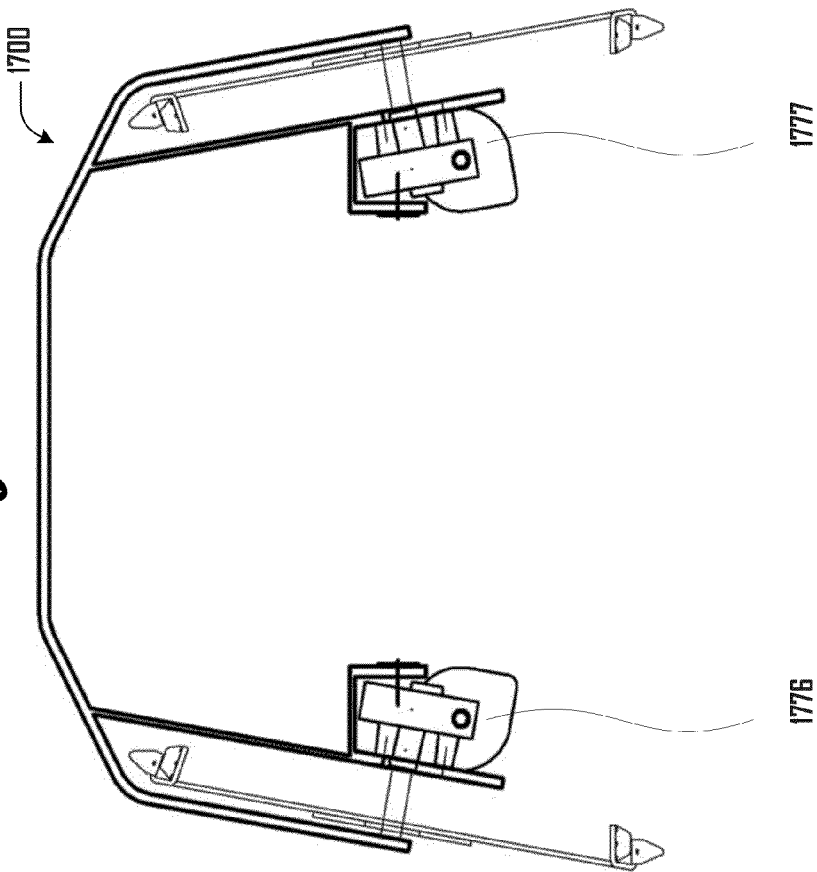
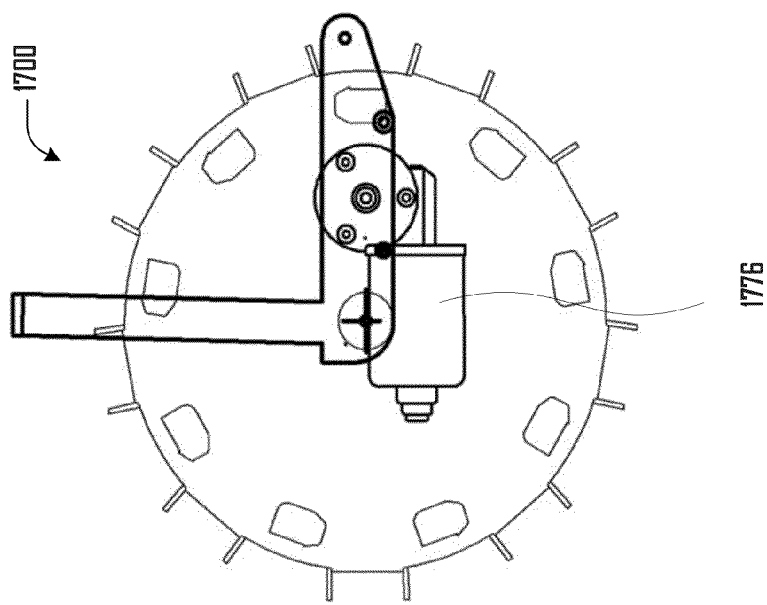

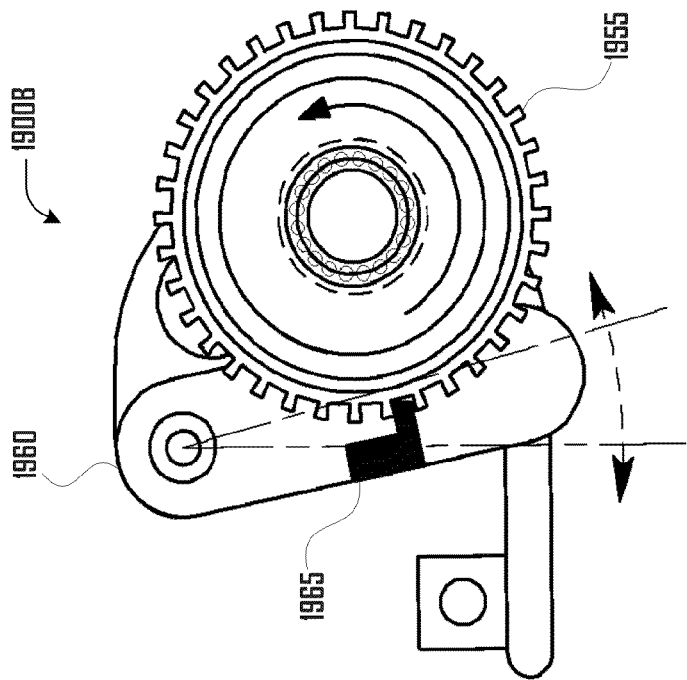
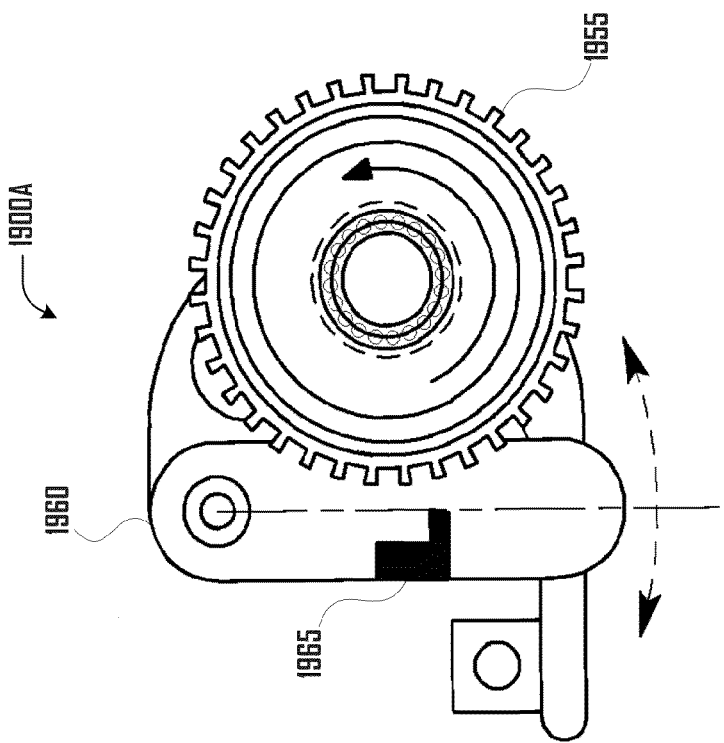

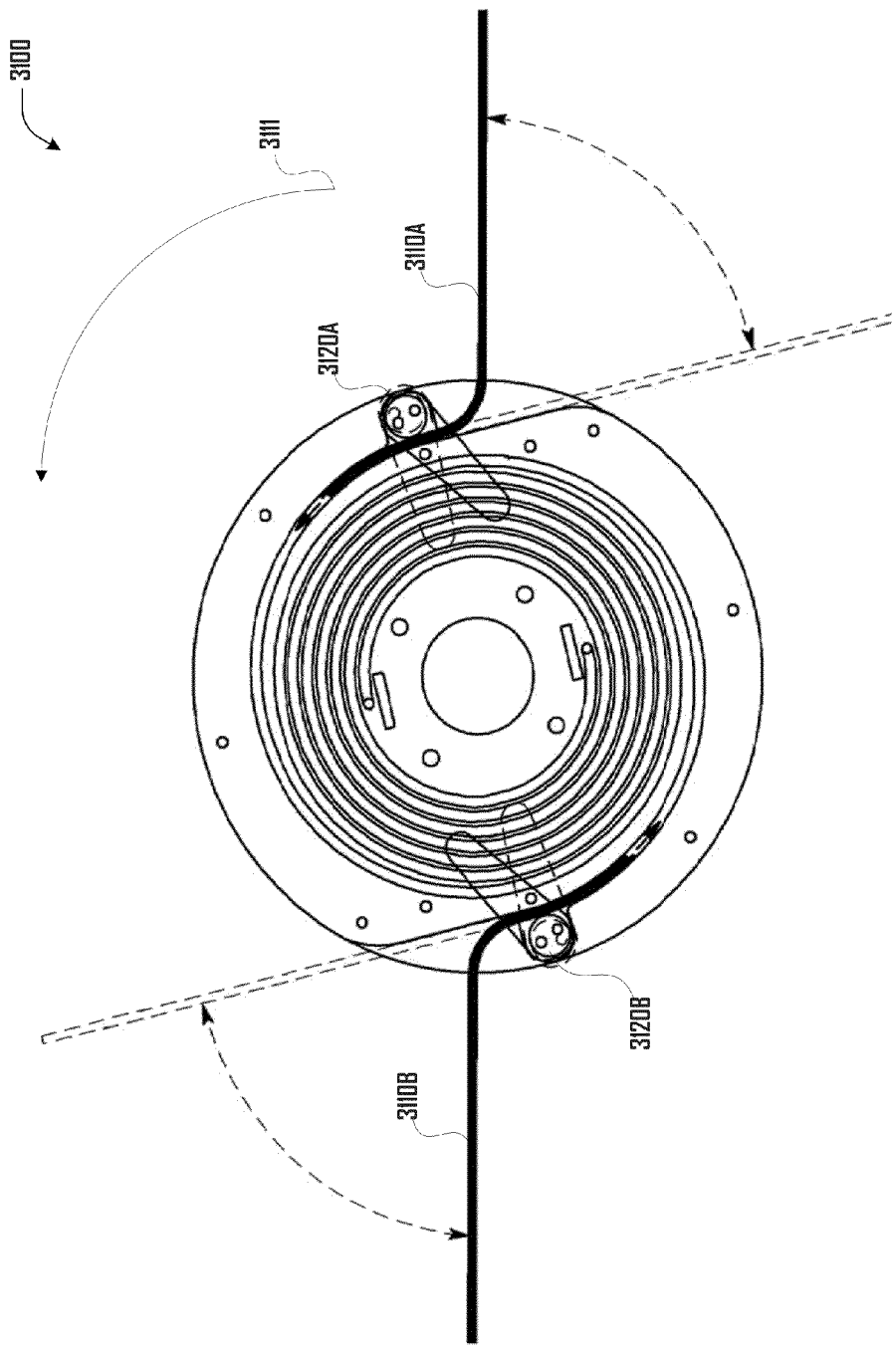

CUTTING HEAD WITH SPIRAL FLAIL LINE STORAGE

RELATED REFERENCES

This application claims priority to U.S. Provisional Application 61/628,119 filed Oct. 25, 2011 entitled REMOTE CONTROL WEED WHACKER/MOWER FOR GROUND LEVEL VEGETATION and to U.S. Provisional Application 61/741,101 filed Jul. 12, 2012 entitled REMOTE CONTROL WEED WHACKER/MOWER FOR GROUND LEVEL VEGETATION. The foregoing applications are hereby incorporated by reference in their entirety as if fully set forth herein.

FIELD

This disclosure relates generally to a remote control vegetation cutting, trimming and mowing apparatus, and more specifically, but not by way of limitation, to remote trimming, cutting, and mowing systems and methods for use on adverse terrain.

BACKGROUND

Regular yard maintenance is needed to keep weeds, grass, and vegetation within desired parameters. Existing methods of trimming, cutting, or mowing weeds, grass, and vegetation often require an operator to be in direct contact with a mower, trimmer, or cutting machine or apparatus. As a result, the terrain must be relatively flat and smooth to allow the operator to safely walk behind, push, or ride the mower. Unfortunately, the terrain of a yard does not always stay within prescribed operational limits so additional tools are often needed to safely complete the yard maintenance whenever the terrain becomes too steep in slope or if irregular surface conditions exist such as bumps, rocks, ditches, and the like. A variety of different yard maintenance tools and devices may be used to access these areas with adverse terrain, such as a boom type weed whacker, trimmer, or brush cutter type tool.

In these adverse conditions, the operator of these tools is physically subjected to any number of harsh conditions. For example, boom type trimmers often need to be carried by the operator, which will place additional stress on the neck, back, shoulders, hands, wrists, legs, and ankles of the operator. Some yard maintenance devices even subject an operator to unnatural vibrations and exhaust fumes. Moreover, the nature of these yard maintenance devices requires that the operator wear protective clothing to shield from flying debris. But even standard protective gear cannot always protect the operator from unexpected environmental dangers accidentally uncovered by the normal operation of the device. For example, a trimmer may inadvertently encounter a ground level bee's nest or accidentally cause the release of a concentrated pollen cloud. Both situations would immediately subject an operator holding the yard maintenance device to a potentially life threatening environment, which is even further complicated if the operator is working on adverse terrain where footing may be unreliable.

BRIEF DESCRIPTION OF THE DRAWINGS

The present disclosure will be presented by way of exemplary embodiments but not limitations, illustrated in the accompanying drawings in which like references denote similar elements, and in which:

FIG. 1 illustrates a suitable operating environment for adverse terrain remote control trimmer systems in accordance with various embodiments.

FIG. 16 is a flail spindle assembly with cutting flail in upper position having a pivotally attached guard assembly, in accordance with various embodiments.

FIG. 17A and FIG. 17B are side view and rear view of a drive chassis in accordance with various embodiments.

FIG. 19A and FIG. 19A are side views of a battery ball clutch transfer mechanism in accordance with various embodiments.

FIG. 31 is a top view of a dual spiral trimmer line storage plate with a trimmer line in accordance with various embodiments.

DESCRIPTION

Figure 2A:
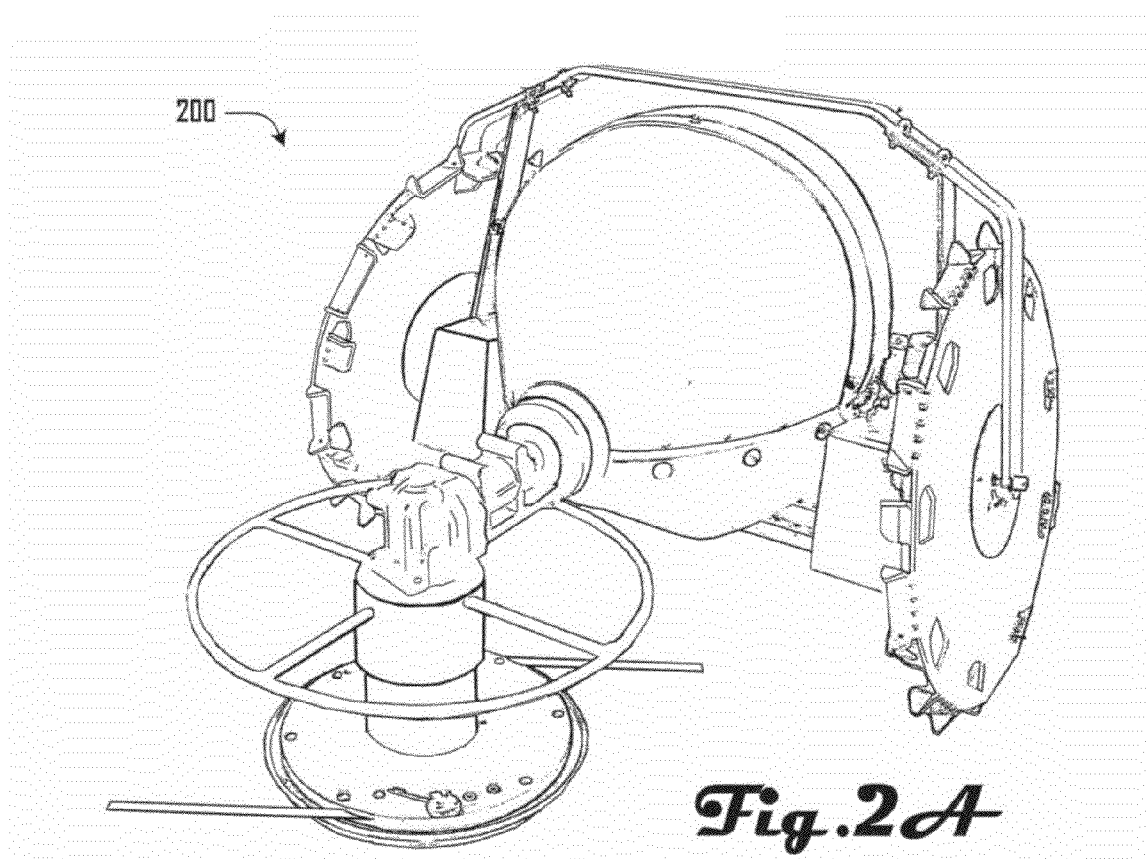
FIG. 2A is a front perspective view and FIG. 2B is a rear perspective view of an adverse terrain remote control trimmer device in accordance with various embodiments.

Illustrative embodiments presented herein include, but are not limited to, systems and methods for adverse terrain remote control trimmer. The term "trimmer" is used for the sake of convenience herein, it being understood to refer, generally, to any vegetation cutting or mowing device.

Various aspects of the illustrative embodiments will be described using terms commonly employed by those skilled in the art to convey the substance of their work to others skilled in the art. However, it will be apparent to those skilled in the art that the embodiments described herein may be practiced with only some of the described aspects. For purposes of explanation, specific numbers, materials and configurations are set forth in order to provide a thorough understanding of the illustrative embodiments. However, it will be apparent to one skilled in the art that the embodiments described herein may be practiced without the specific details. In other instances, well-known features are omitted or simplified in order not to obscure the illustrative embodiments.

Further, various operations and/or communications will be described as multiple discrete operations and/or communications, in turn, in a manner that is most helpful in understanding the embodiments described herein; however, the order of description should not be construed as to imply that these operations and/or communications are necessarily order dependent. In particular, these operations and/or communications need not be performed in the order of presentation.

The phrase "in one embodiment" is used repeatedly. The phrase generally does not refer to the same embodiment; however, it may. The terms "comprising," "having" and "including" are synonymous, unless the context dictates otherwise.

FIG. 1 illustrates several components of a suitable operating environment 100 for adverse terrain remote control trimmer systems, in accordance with at least one embodiment. Those of ordinary skill in the art and others will appreciate that the operating environment 100 may include many more components than those shown in FIG. 1. However, it is not necessary that all of these generally conventional components be shown in order to disclose an enabling embodiment for practicing the embodiments described herein. As shown in FIG. 1, the operating environment 100 includes a safe operation zone 130 for an operator 110 to be while attempting to remotely maintain a yard 120. The safe operation zone 130 may or may not be physically located with yard 120. Additionally, in various embodiments, the safe operation zone 130 may change according to the relative location of the operator 110 to the trimmer 200 or to the relative position of the trimmer 200 within the yard 120. The yard 120 may include adverse terrain which exceeds traditional safe operating conditions. These unsafe operating conditions may include, but are not limited to, steep slopes in excess of 15 degrees, holes, rocks, bumps, and other dangerous surface conditions, including but not limited to, hard soil and soft soil where a device may have traction challenges.

Figure 2B:
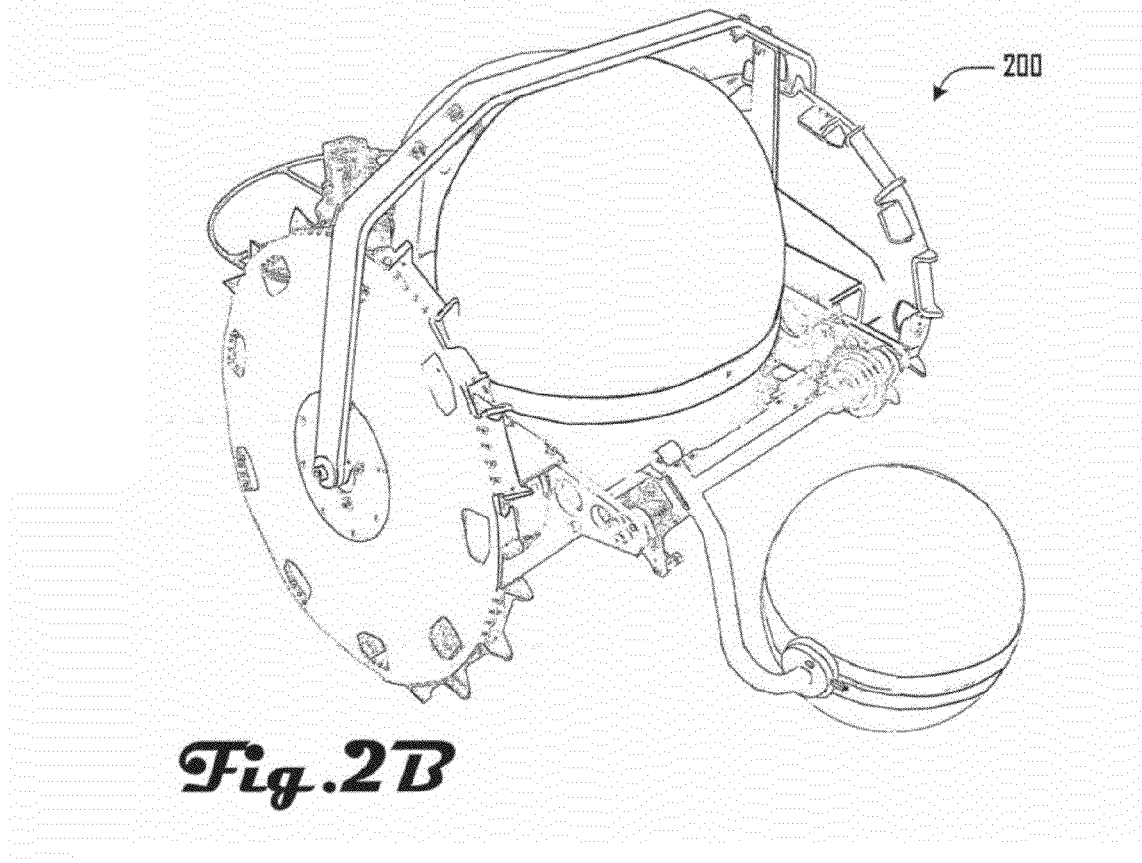

To safely overcome these adverse conditions, the operator 110, while standing within a safe operation zone 130, may use a remote controller 2500 to control a trimmer 200 configured to operate in adverse conditions. The safe operation zone 130, may or may not be located with yard 120, but is typically within a safe visual operating distance of the trimmer 200. In one embodiment, the safe visual operating distance is less than about 150 feet. The adverse terrain trimmer 200 may include a variety of remote yard maintenance devices including a mower, weed whacker, trimmer, or other cutting device configured to operate in adverse conditions. FIG. 2A and FIG. 2B provide perspective views of an adverse terrain trimmer 200 in accordance with various embodiments.

In one embodiment, shown in FIG. 1, the trimmer 200 is in direct wireless communication with the remote controller 2500. In addition to traditional left turn and right turn controls and/or forward and reverse drive controls, the remote controller 2500 may also provide the operator with remote access to a variety of other features on the trimmer 200. In one embodiment, these features may include drive mechanisms, throttle levels, operating heights and cutting head positions. In one embodiment, the remote controller 2500 is a multi-channel radio controller where each control channel is dedicated to controlling one or more functions on the trimmer 200. For example, in the embodiment illustrated in FIG. 1, the controller 200 may have at least four control channels for the electric motor controller, the solenoid latch, the throttle servo, and/or the gas engine starter.

Figure 3:
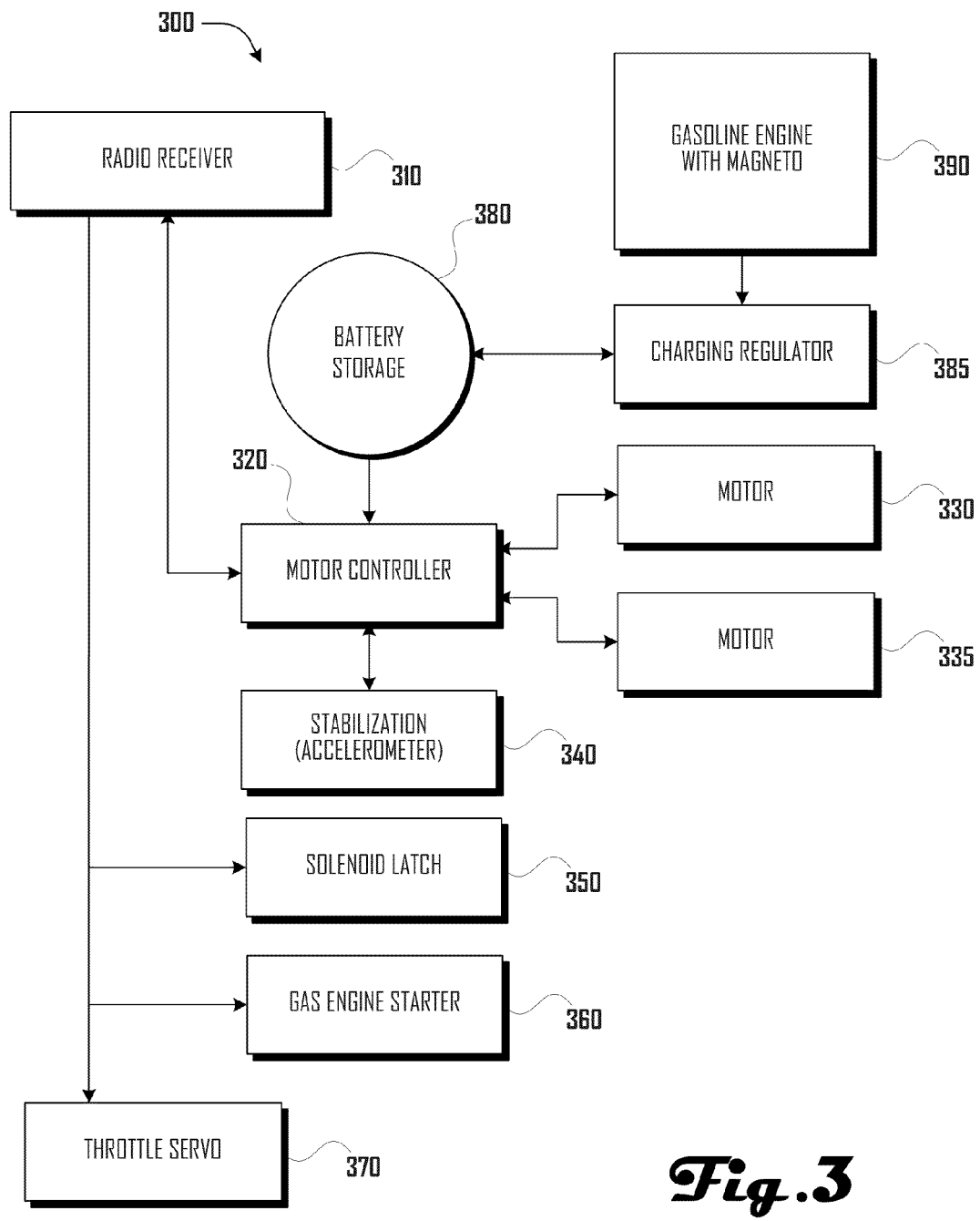
FIG. 3 is a block diagram of an adverse terrain remote control trimmer device, in accordance with various embodiments.

Referring now to FIG. 3, a block diagram of an adverse terrain remote control trimmer device 300 is shown in accordance with various embodiments. The trimmer device 300 includes a radio receiver 310, a motor controller 320, electric drive motors (330, 335), a stabilization component 340, a solenoid latch 350, gas engine starter 360, throttle servo 370, battery storage device 380, charging regulator 385, and a gasoline engine 390 with a magneto.

In one embodiment, the radio receiver 310 is coupled to a conventional hobby level spread spectrum multi-channel radio transmitter and receiver. Other wireless controllers may also be substituted including digital, Bluetooth, cellular, infrared, and other wireless Radio Frequency (RF) remote control and telemetry devices. The motor controller 320 receives controls from the radio receiver 310 for the electric drive motors (330, 335) each drive motor attached to a different drive wheel. In one embodiment, the motor controller 320 includes an electronic speed control circuit coupled with a servo to vary the speed of the gas engine and the electric motors associated with each wheel. In this manner, the two traction wheels may turn independently of each other, among other benefits, this configuration helps decrease the turning radius and increase the stability of the device. The motor controller 320 may be a stand-alone unit which plugs into the receiver's motor control channel or incorporated into the receiver itself. In one embodiment, the electric drive motors (330, 335) could be brushed or brushless.

In one embodiment, the stabilization component 340 monitors the relative position of the trimmer to the surrounding adverse terrain. The stabilization component 340 may employ the use of at least one accelerometer to detect changes in acceleration due in part to the slope of the terrain relative to the trimmer. In one embodiment, the stabilization component 340 may include use of a calibrated mercury tilt switch to detect changes in the physical position of the trimmer. Other methods to identify and detect relative changes to gravity or other inertia on the trimmer may also be employed by the stabilization component 340.

Figure 23:
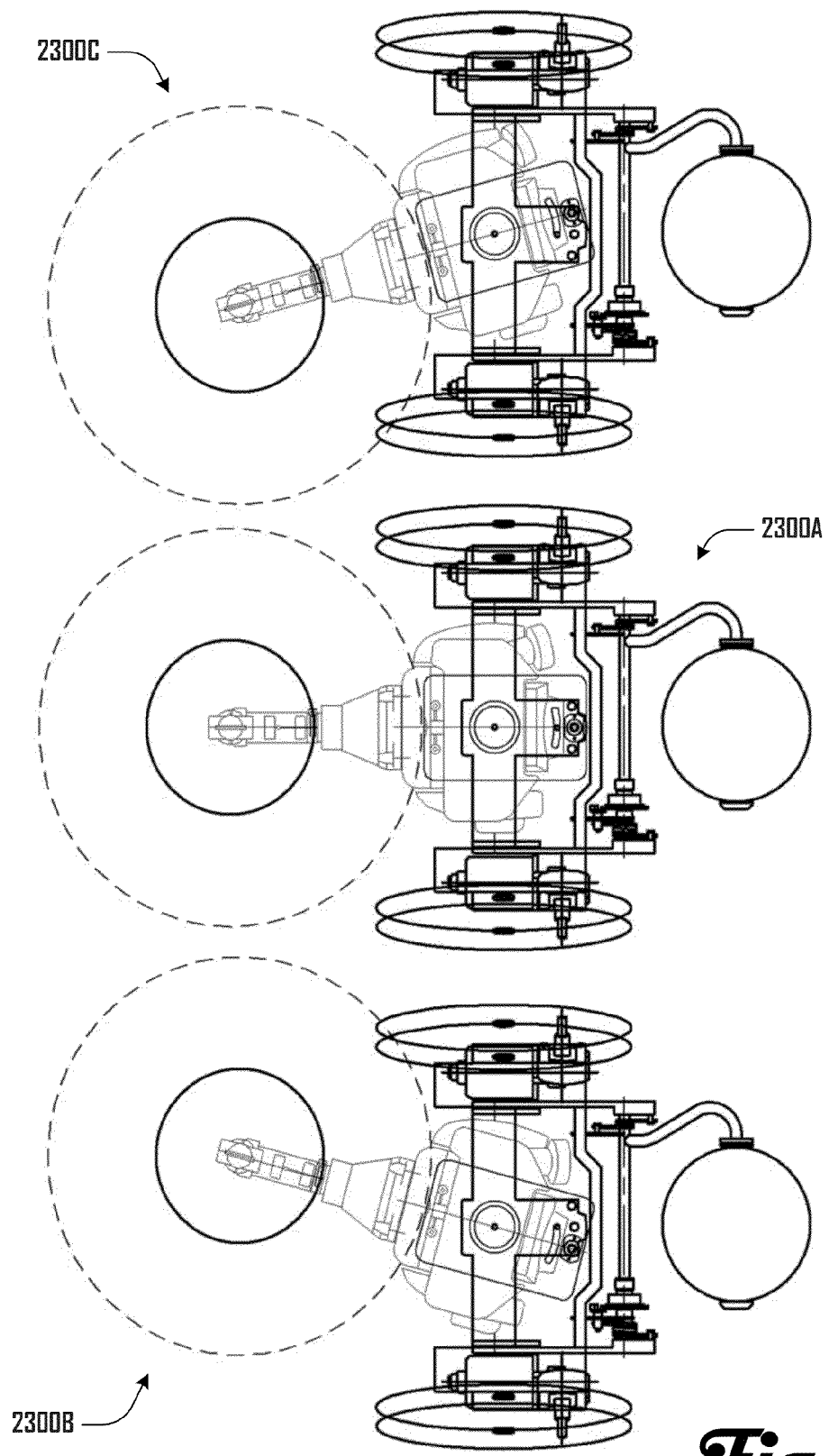
FIG. 23 is a bottom view of optimal trimming positions in accordance with various embodiments.

In one embodiment, the solenoid latch 350 allows the trimmer device 300 to release and pivot about a vertical axis of a mid-point of the two drive wheels between various optimal trimming positions, such as those show in FIG. 23 namely, a right edge position 2300B, a left edge position 2300C, or a centered position 2300A. Alternatively, the trimmer may rotate between only two positions, centered and edge trimming. However the three-position configuration would likely be more challenging for the operator to use and a two-position configuration may be found in a commercial implementation.

In one embodiment, the gas engine starter 360 provides a momentary switch to start the gas engine that rotates the trimmer flail cutting head. The gas engine 390 also includes a magneto that is coupled with a charging regulator 385 to charge and maintain the removable battery storage 380. In one embodiment, a gas motor with a large enough magneto could supplement and/or replace the electric battery system and extend the operation time of the trimmer 300 until the fuel runs out which might be more practical in an industrial solution. However, in a residential solution, use of the removable battery storage 380 in combination with the smaller gas engine allows the trimmer device to be more portable such as a residential trimming device 300 that may, for example, weigh less than 50 pounds.

Figure 4:
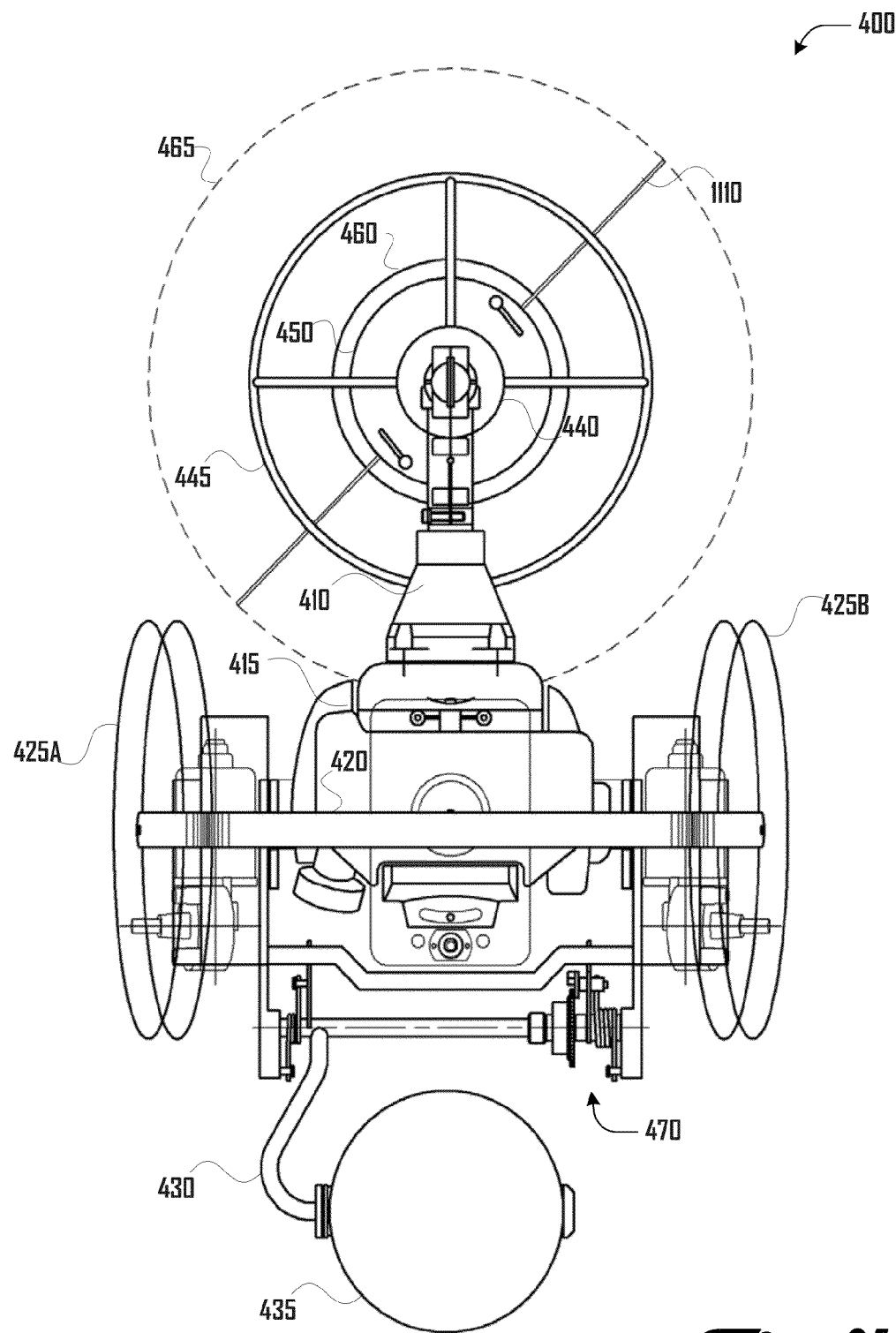
FIG. 4 is a top view of an adverse terrain remote control trimmer device in accordance with various embodiments.

Referring now to FIG. 4, a top view diagram of an adverse terrain remote control trimmer device 400 is shown in accordance with various embodiments. The trimmer device 400 includes a first floating flail head chassis 410, a second drive chassis 420, and a third stabilizing battery ball chassis 430. The first floating flail head chassis 410 includes a flail spindle assembly 440, a flail spindle guard 445, a cutting flail 450, a floating flail plate 460 and a flail line 1110 rotating to form a flail cutting circle. Examples of the flail spindle assembly 440 in different cutting positions are illustrated below in FIGS. 11-16. The second drive chassis 420 includes traction wheels 425A and 425B and associated drive motors. The third stabilizing battery ball chassis 430 includes a removable anti-tilt battery ball 435 and a torsion spring system 470 for articulating the battery ball 435 to conform to adverse terrain.

Figure 5:
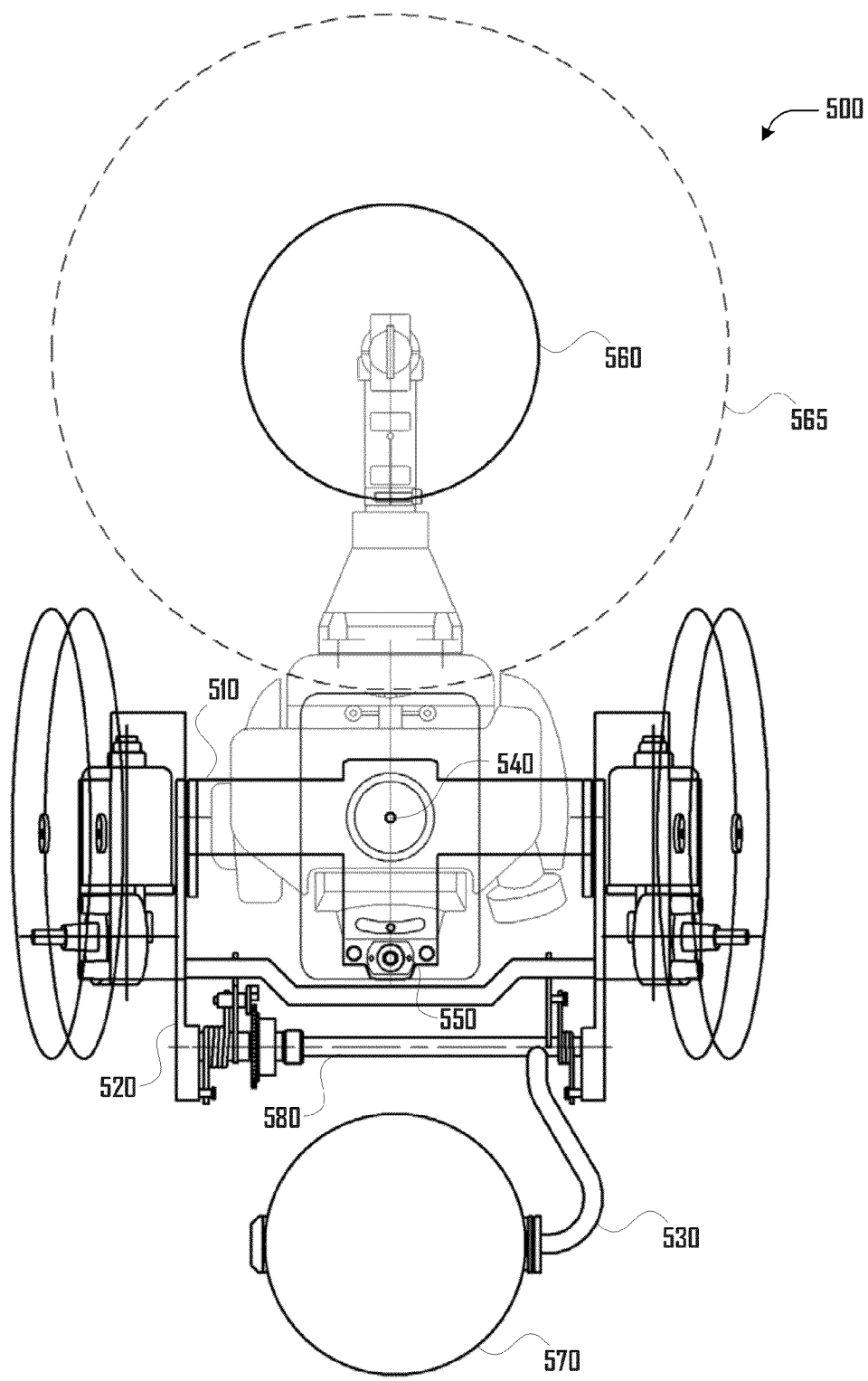
FIG. 5 is a bottom view of an adverse terrain remote control trimmer device in accordance with various embodiments

Referring now to FIG. 5, a bottom view diagram of an adverse terrain remote control trimmer device 500 is shown in accordance with various embodiments. The trimmer device 500 includes a first floating flail head chassis 510, a second drive chassis 520, and a third stabilizing battery ball chassis 530. The first floating flail head chassis 510 showing a floating flail plate 560 protecting the flail, which cuts in a flail cutting circle 565. The bottom view also includes a pivot point 540 between the first and second chassis sections to offset the flail for trimming edges and against vertical surfaces, such as retaining walls. The solenoid latch 560 to release connections between the first chassis and the second chassis to allow drive wheels to select offset positions is also viewable from the bottom view. The third stabilizing battery ball chassis 530 includes battery ball 570 and battery ball lever arm and torsion spring system 580.

Figure 6:
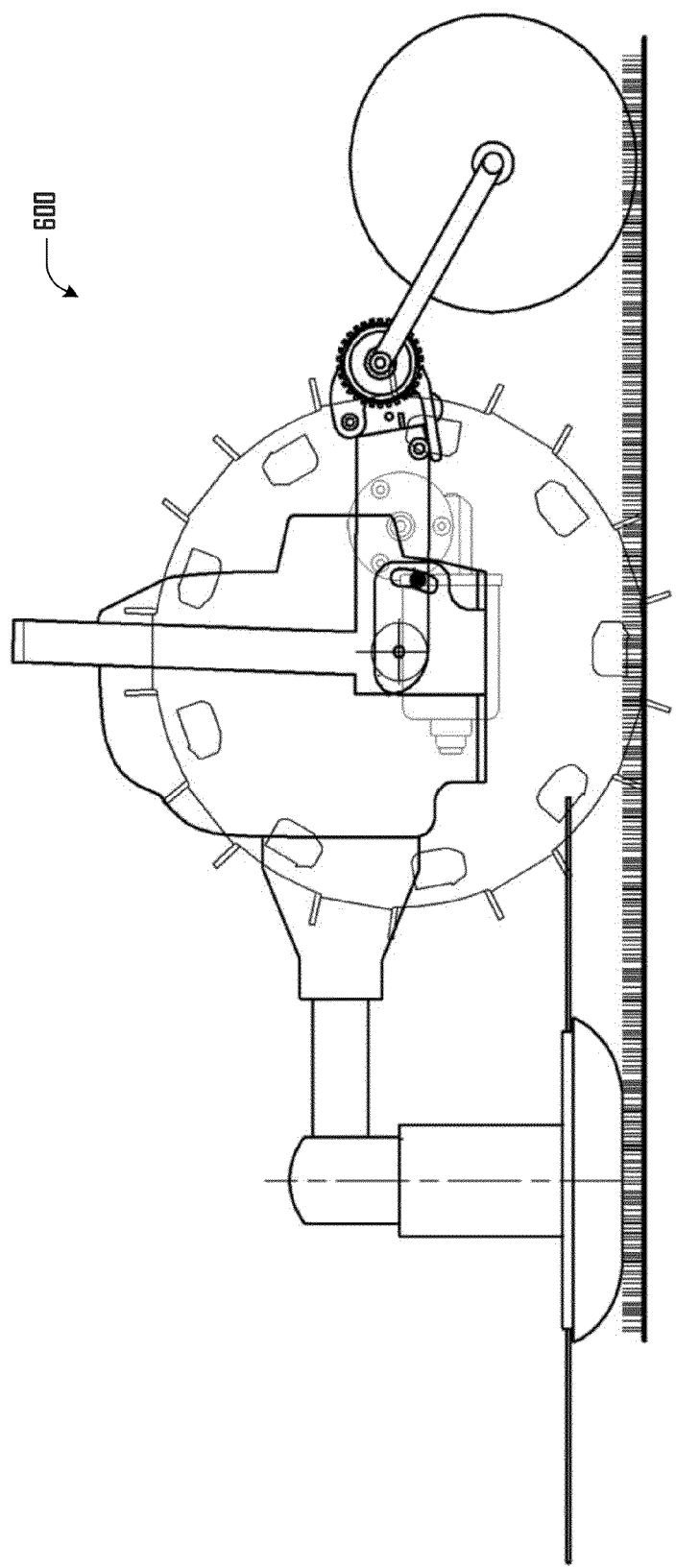
FIG. 6 is a side view of an adverse terrain remote control trimmer device on neutral terrain in accordance with various embodiments.

Referring now to FIG. 6, a side view of an adverse terrain remote control trimmer device on neutral terrain (level grass turf) is shown in accordance with various embodiments. In the neutral position, both the flail plate and battery ball float and rely primarily on the drive wheels for movement and traction.

Figure 7:
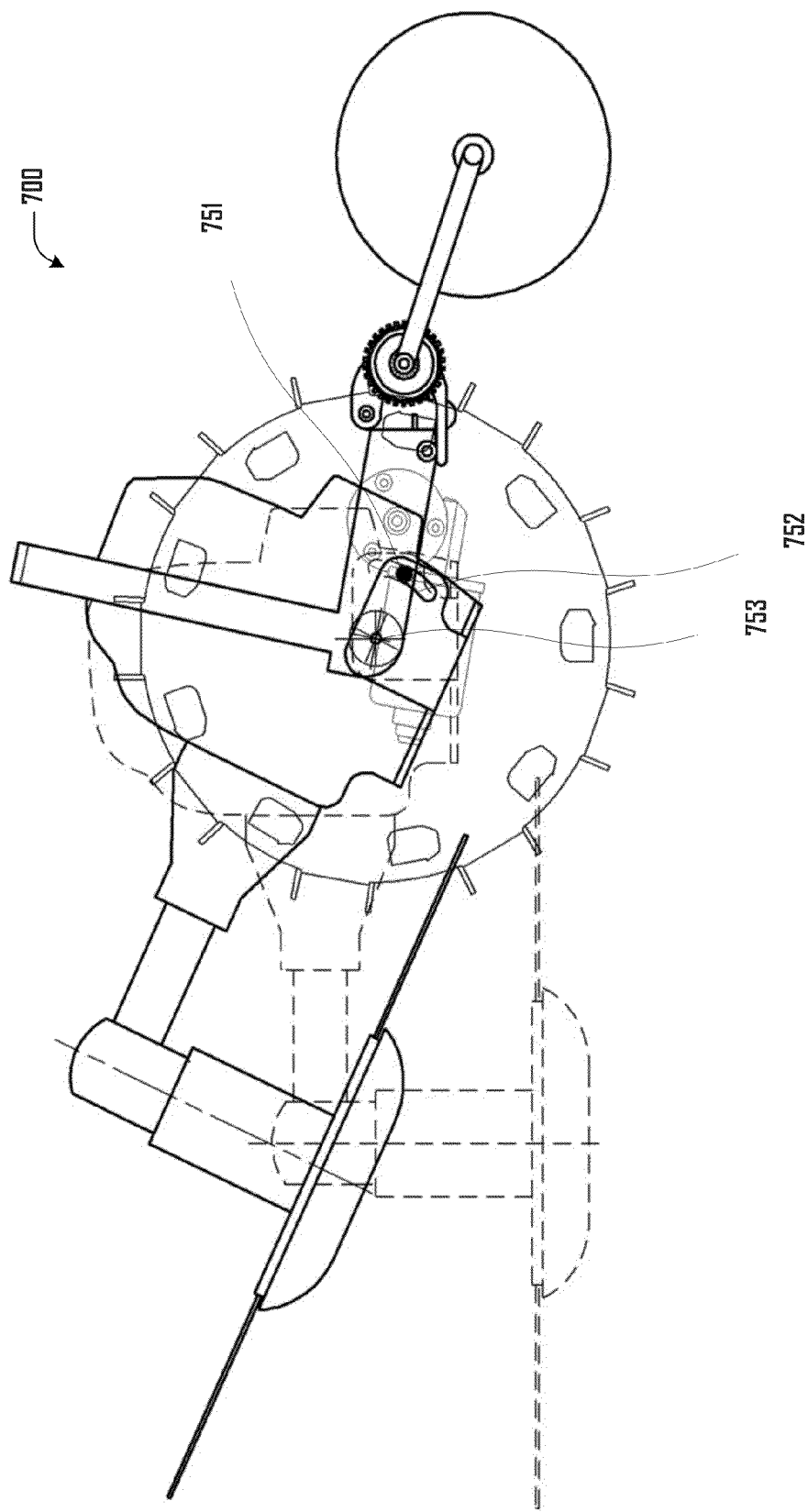
FIG. 7 is a side view of an adverse terrain remote control trimmer device illustrating possible articulation of the floating flail head chassis in accordance with various embodiments.

Referring now to FIG. 7, a side view of an adverse terrain remote control trimmer device 700 illustrating possible articulation of the floating flail head chassis is shown in accordance with various embodiments. The floating flail head chassis floats freely on the flail plate of the cutting flail head about the wheel center axis in accordance with various embodiments. In one embodiment, the flail head is allowed to articulate within a 25-30 degree range before additional action is taken by the adverse terrain trimmer device 700 to conform to the terrain. In one embodiment, a stop pin 751 of the second drive chassis is placed with a rotation limiting slot 752 of the floating flail head chassis to limit the articulation, which also may help to prevent the floating flail head chassis from articulating beyond safe position during operation. In FIG. 7, the first floating flail head chassis rotates about a center axis 753 a within 25 to 30 degree range before affecting the second drive chassis via the stop pin and slot.

Figure 8:
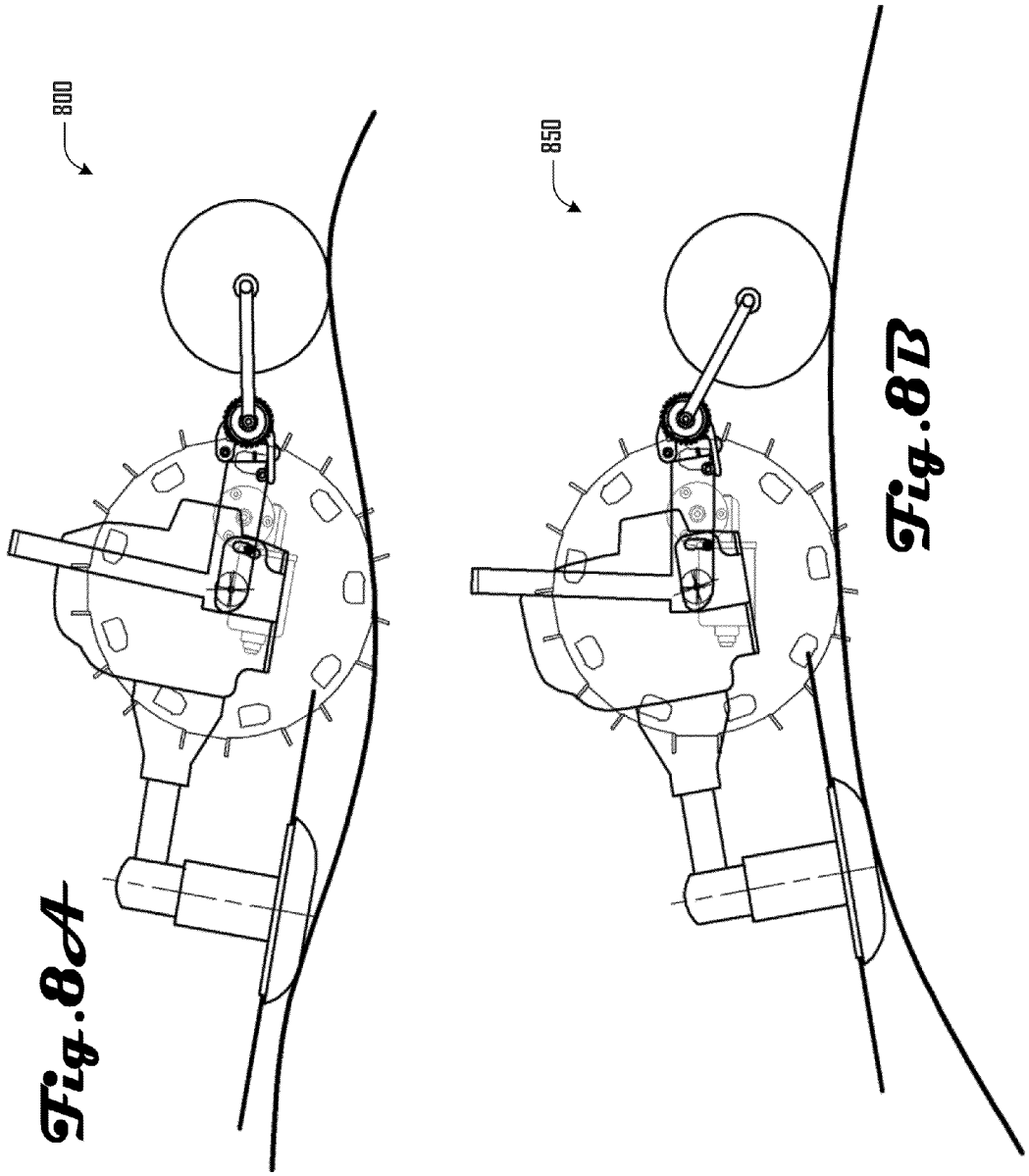
FIG. 8A and FIG. 8B are side views of an adverse terrain remote control trimmer device illustrating possible articulations to conform to different adverse surface conditions in accordance with various embodiments.

Referring now to FIG. 8A and FIG. 8B, side views of an adverse terrain remote control trimmer device are illustrated showing possible articulations to conform to different adverse surface conditions in accordance with various embodiments. FIG. 8A illustrates the adverse terrain trimmer device 800 in a rut in which the terrain sinks in a particular spot causing both the first and third chassis sections to rise above the neutral position with the center drive chassis section. FIG. 8B illustrates the adverse terrain trimmer device 850 going over a hill or bump in which the terrain rises in a particular spot causing both the first and third chassis sections to drop below the neutral position with the center drive chassis section. In one embodiment, terrain variations of less than approximately 15 degree slopes allow the battery arm resistance level to remain low, thereby allowing for chassis articulation to conform to adverse surface conditions without depriving the drive wheels of traction.

Figure 9:
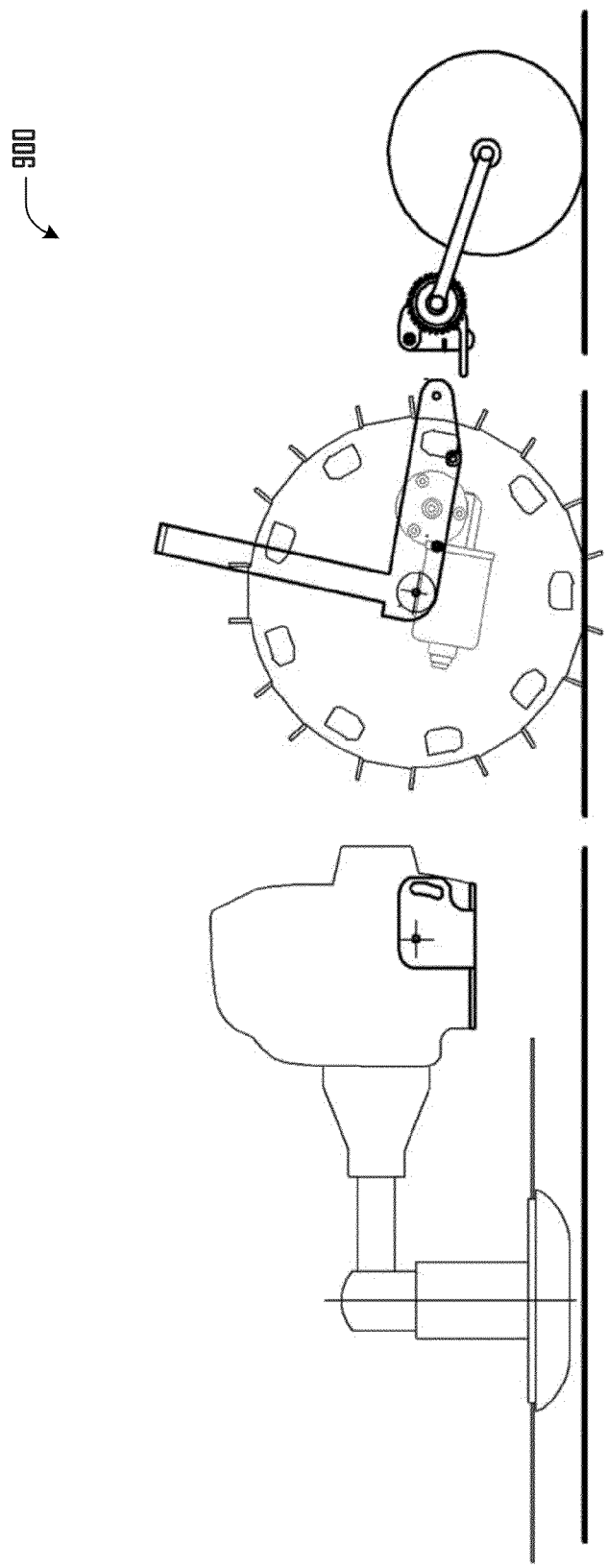
FIG. 9 is an exploded side view of an adverse terrain remote control trimmer device illustrating a floating flail head chassis, a drive chassis, and a stabilizing battery ball chassis in accordance with various embodiments.

Referring now to FIG. 9, an exploded side view of an adverse terrain remote control trimmer device 900 illustrating a floating flail head chassis, a drive chassis, and a stabilizing battery ball chassis is shown in accordance with various embodiments. As shown, in one embodiment, the floating flail head chassis includes a gasoline engine, a cutting head, and a drive train between the engine and the cutting head. In the illustrated embodiment, the drive chassis carries the electric drive motors and wheel assemblies. The stabilizing battery ball chassis includes the anti-tilt battery ball, which may also function as a ballast. The battery ball includes a battery housing that circulates about a battery pack.

Figure 10:
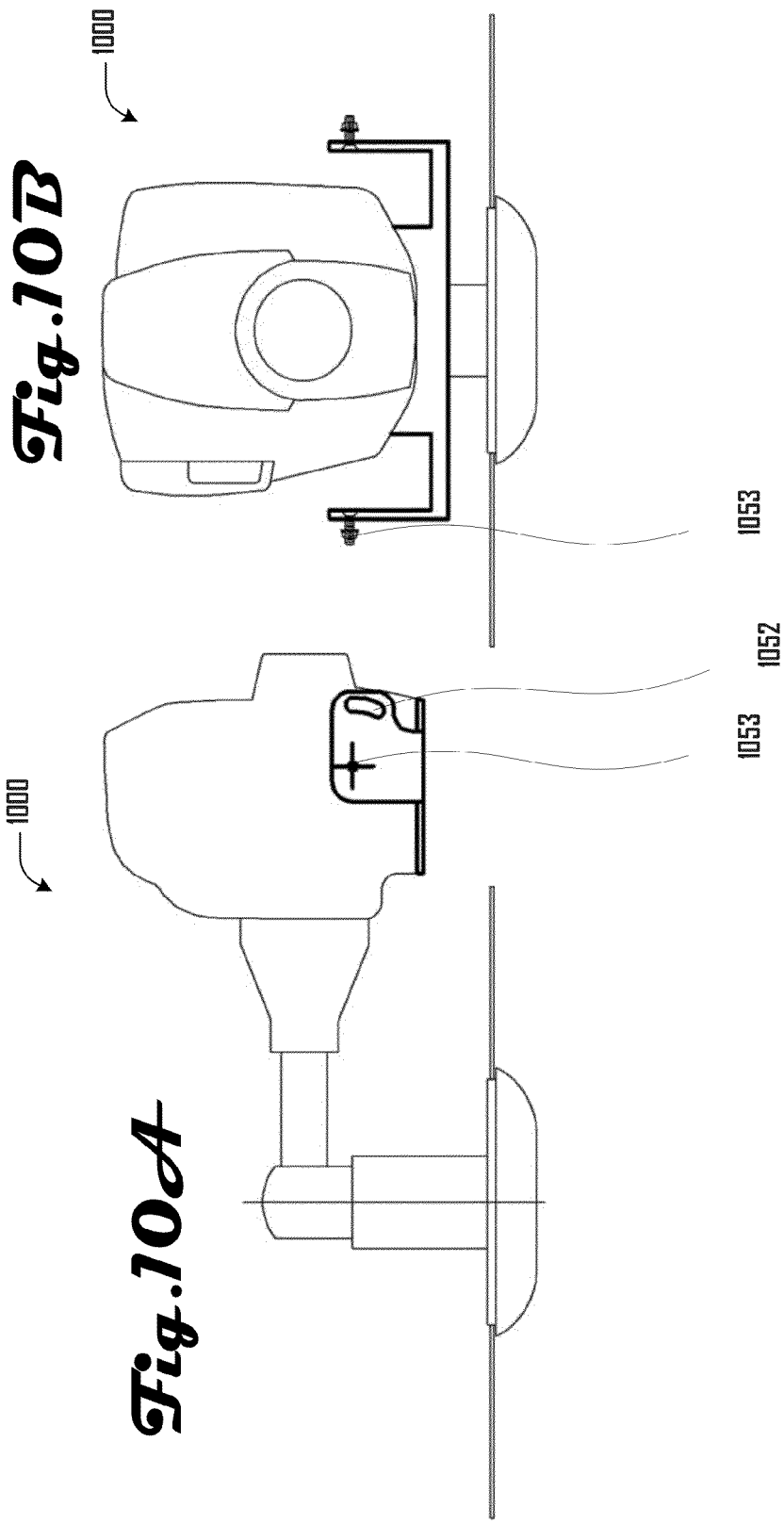
FIG. 10A and FIG. 10B are side view and rear view of a floating flail head chassis in accordance with various embodiments.

Referring now to FIG. 10A and FIG. 10B, a side view and a rear view of a floating flail head chassis are shown in accordance with various embodiments. A central axis 1053 and a rotation limiting slot 1052 are both visible from the side view in FIG. 10A. The support frame of the floating flail head chassis for the gas motor is visible from the rear view of FIG. 10B.

Figure 11:
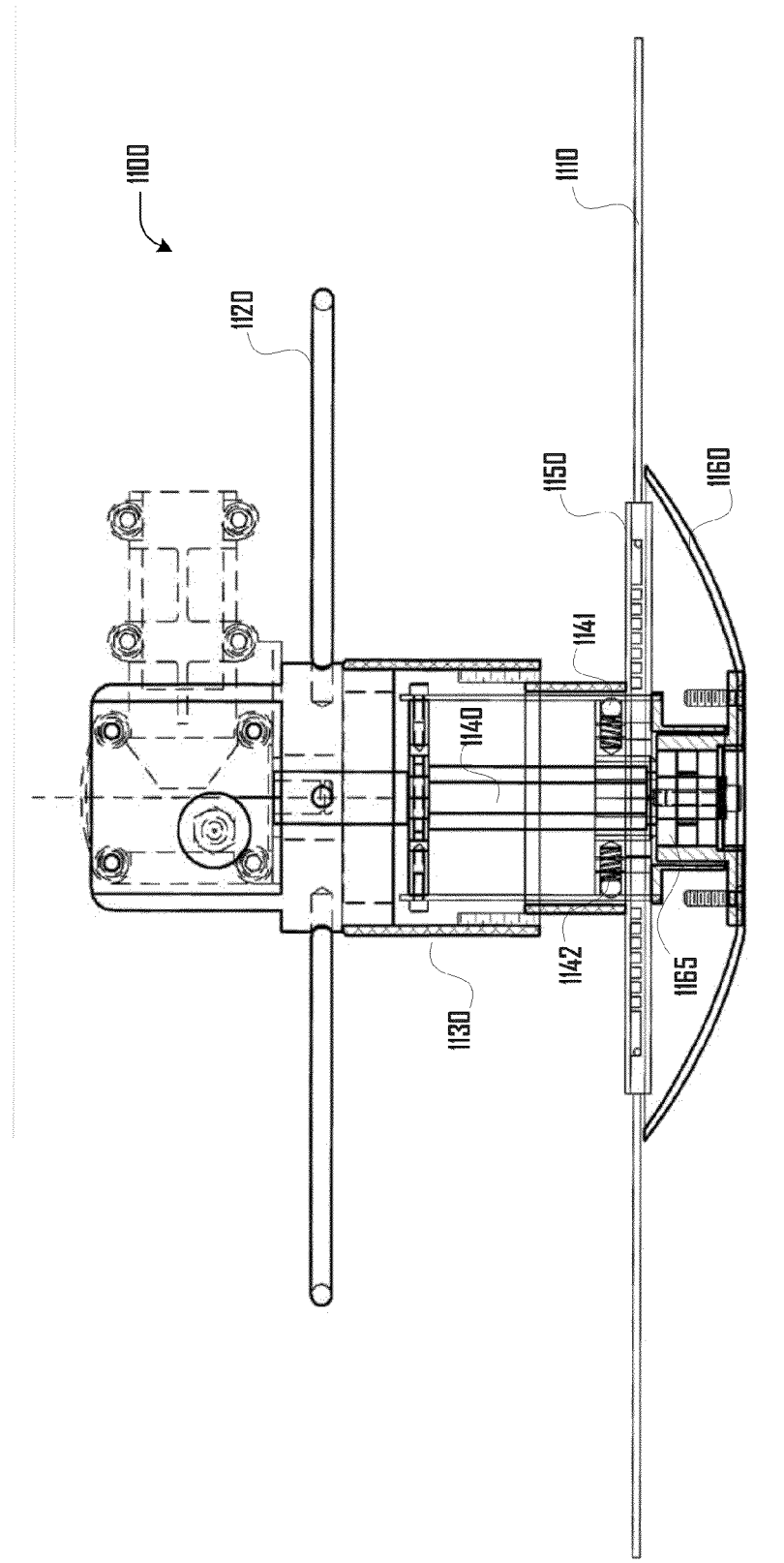
FIG. 11 is a flail spindle assembly with cutting flail in lower position, in accordance with various embodiments.

Referring now to FIG. 11, a flail spindle assembly 1100 with cutting flail in lower position is shown in accordance with various embodiments. The adjustable flail spindle assembly 1100 including a flail 1110, a flail guard 1120, an adjustable flail head 1130, a drive shaft 1140, a spiral flail line storage head 1150, and a flail plate 1160.

In one embodiment, the flail guard 1120 is a rigid frame, circular in form of a diameter approximately two-thirds that of the flail's cutting diameter residing about the center axis of the cutting head's vertical spindle and parallel to the ground. The flail guard 1120 may also act as a bumper to encounter objects prior to that of the flail plate's outer perimeter making contact, thereby extending the lifetime of the flail. In various embodiments, the flail guard 1120 may be constructed of any number of materials such as aluminum, plastic, steel, engineered composite material, or other combinations of materials. In one embodiment, the flail guard 1120 a flexible or semi-rigid frame circular in form to better act as a bumper being capable of absorbing impact shock forces to reduce potential damage to the rest of the machine.

Figure 30A:
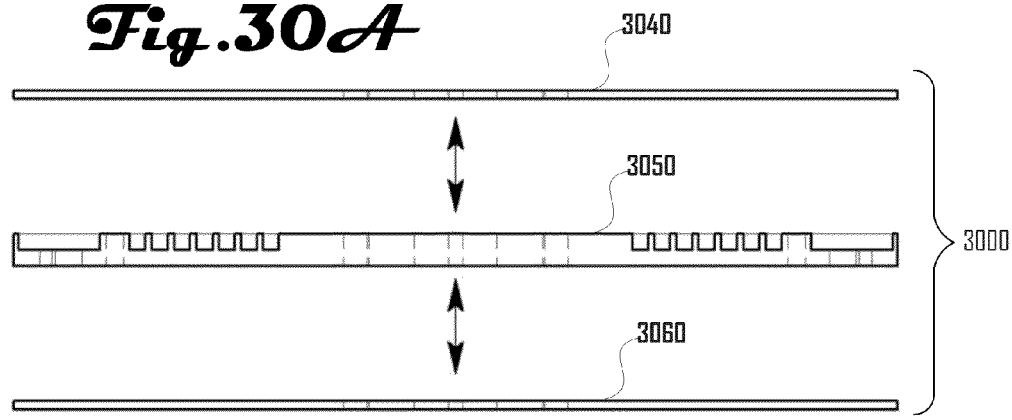
FIG. 30A is a cross sectional side view of a spiral flail line storage head in accordance with various embodiments.
Figure 30B:
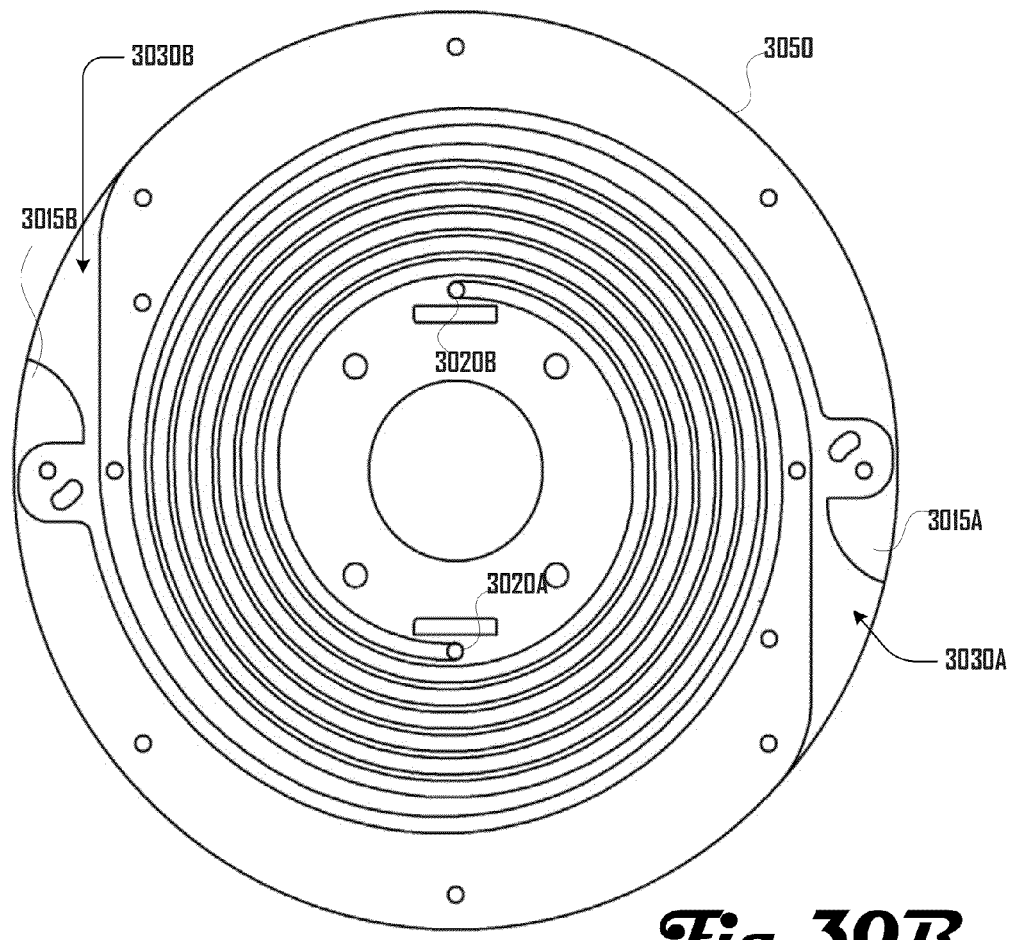
FIG. 30B is a top view of a dual spiral line plate in accordance with various embodiments.
Figure 32:
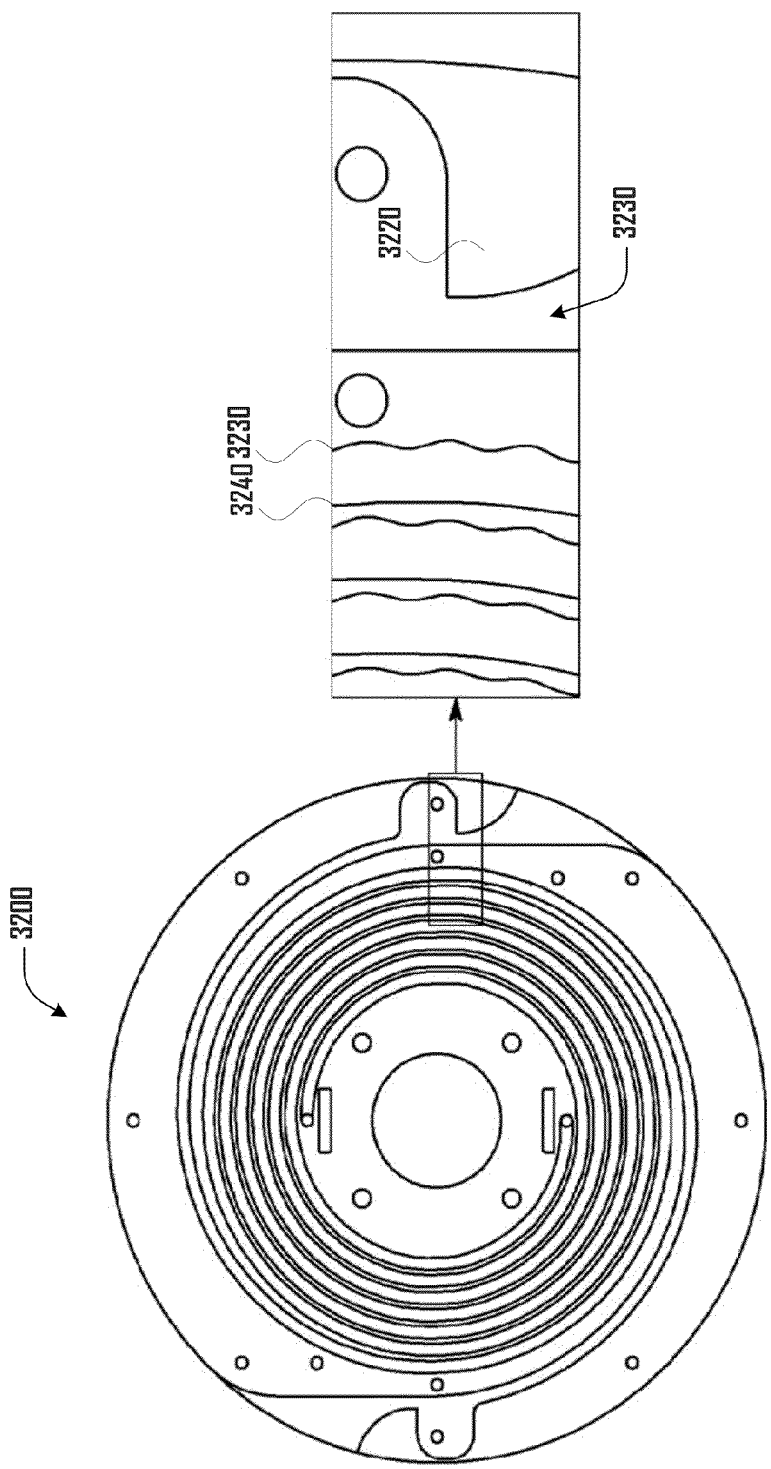
FIG. 32 is a top view of a dual spiral trimmer line storage plate with a magnified view of a portion of the storage plate in accordance with various embodiments.

FIGS. 30-32 show features of various embodiments of a spiral flail line storage head 1150, in greater detail, that are considered suitable for use with at least one embodiment of the adverse terrain trimmer. FIG. 30A illustrates a cross sectional side view of a spiral flail line storage head 3000 having an upper plate 3040, a dual spiral line plate 3050, and a lower plate 3060. FIG. 30B provides a top view of the dual spiral line plate 3050. In one embodiment, the dual spiral line plate 3050 is configured to receive cutting trimmer line into one of two spiral channels 3030A and 3030B. These channels may be configured as archimedean spirals, equiangular spirals, three-dimensional spirals (such as a helix), or other spiral designs configured to hold excess trimmer line. In one embodiment, the trimmer line may be fed into the channel until one end of the trimmer line reaches the channel termination point 3020A and 3020B. In another embodiment, the upper plate 3040 or the lower plate 3060 may be removed to allow access to load the trimmer line into the dual spiral line plate 3050. Depending on the spiral configuration, various embodiments may store several cutting flail lengths of trimmer line in the dual spiral line plate 3050. Having extra line allows for extended operation of the adverse terrain remote control trimmer device in remote adverse conditions. FIG. 32 illustrates a top view of a dual spiral trimmer line storage plate 3200 with a magnified view of a portion of the storage plate in accordance with various embodiments. The magnified portion includes the curved channel egress wall 3220 and wide channel entrance 3230, but also shows the channel walls, specifically the rough outer channel wall 3230 and the smooth inner channel wall 3240. In one embodiment, the rough outer channel wall 3230 allows the trimmer line to be fed into the channel without binding when the trimmer head is not spinning.

In at least one embodiment, the wide channel entrances are wider than the interior of the spiral channels. Among other features, this wide opening makes feeding the trimmer line into the channel easier than other traditional trimmers. In FIG. 30, the curved configuration of the exterior of the curved channel egress wall 3015A and 3015B also provides extended operational life to the trimmer line. The wear and tear on the trimmer line is reduced in at least one of two ways. First, the egress walls 3015A and 3015B are configured with a curved edge rather than a sharp edge to minimize early flail breakoff during rotation. Second, the egress shape and associated available egress space allows for the cutting flail to recoil upon encountering hard objects, such as rocks, rather than breakoff. The range of recoil motion available to the cutting flail trimmer line (3110A and 3110B; dotted lines showing example recoil positions) in one embodiment of a spiral flail line storage plate 3100 is illustrated in FIG. 31. The direction of rotation of the trimmer head is illustrated at element 3111.

As illustrated in FIG. 31, when not rotating, the trimmer line generally proceeds approximately straight out of the spiral channels, tangential to the perimeter of the spiral line plate; when rotating, the trimmer line is forced outward by centrifugal (or equivalent) force into a radial position relative to the spiral line plate. In one embodiment, the trimmer line 3110 used in the cutting flail is held in place by a latch 3120, having a latched position and an unlatched position. The latch 3120 in the latched position preventing the trimmer line stored within the spiral from slipping out during operation. As shown, the trimmer line need not be fed to the end of the channel to be operational. By providing additional flexibility for recoil, the spiral flail line storage plate 3100 substantially extends the operational lifetime of the trimmer line used in the cutting flail, which in turn allows the device to continue remote operations in adverse terrain longer. Extending operational time between maintenance also potentially reduces the number of in the field repairs needed and thereby avoids risks to the device operator that might occur during those repairs. For example, performing field repairs and maintenance on adverse terrain, such as steep inclines, can be extremely dangerous to the operator. In certain conditions, the trimmer device may even rollover during the repair. Although the rollbar and other safety devices, in one embodiment, prevent substantial damage to the trimmer device, these mechanisms do not necessarily prevent the operator from being injured. However, lowering the number of times that in-the-field maintenance needs to be performed can reduce this risk.

Returning to FIG. 11, the adjustable flail spindle assembly 1100 may also include vertical detent bars 1142 and balls 1141 to allow the vertical adjustment of the cutting head. As shown, in the lowered position, the cutting assembly, including the spiral flail head and flail, are lowered to just above the flail plate. In one embodiment, the flail plate 1160 spins freely from the rest of the flail spindle assembly 1100 via ball bearings 1165.

Figure 12:
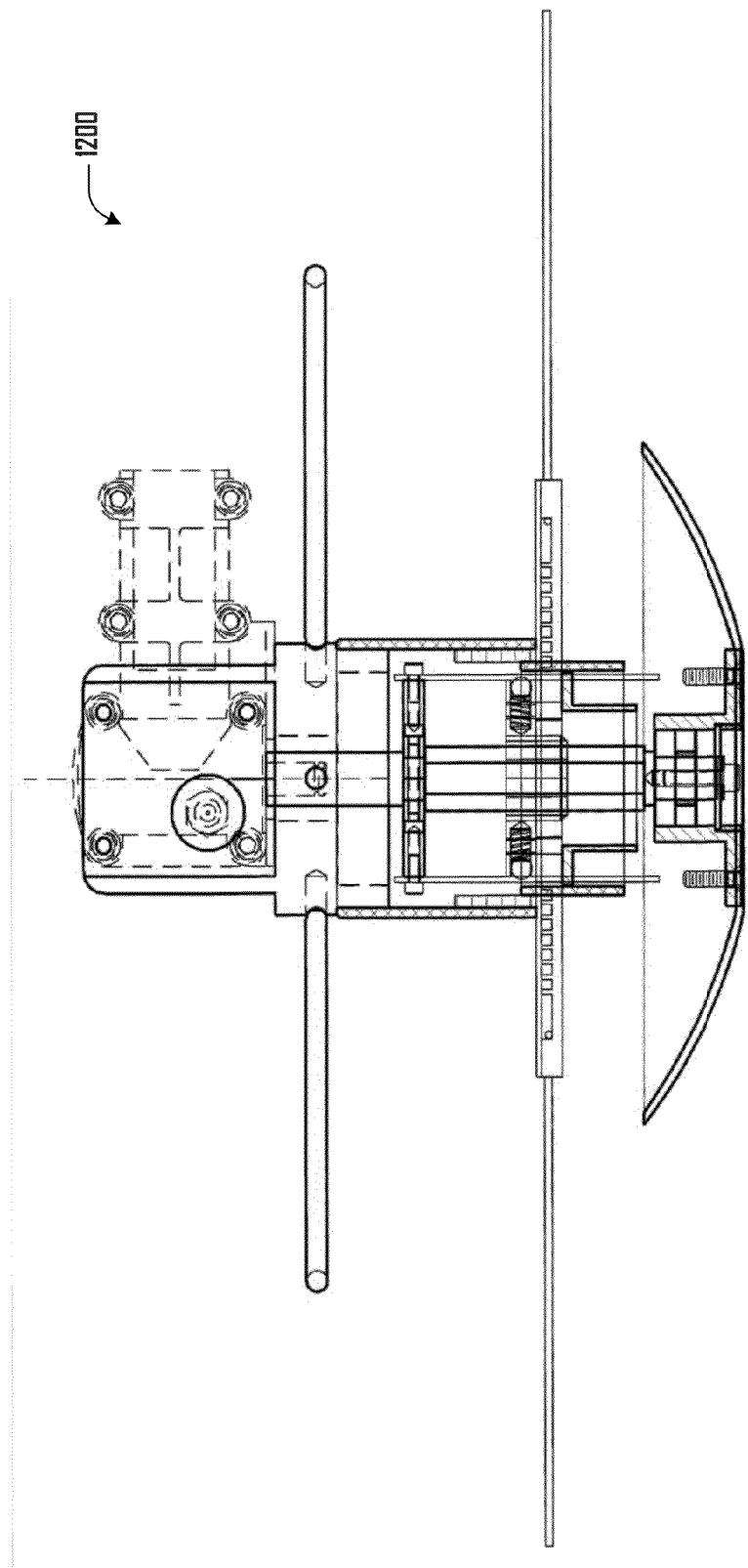
FIG. 12 is a flail spindle assembly with cutting flail in upper position, in accordance with various embodiments.

Referring to FIG. 12, a flail spindle assembly 1200 with cutting flail in upper position is shown in accordance with various embodiments. As shown, in the upper position, the cutting assembly, including the spiral flail head and flail, are raised to adjust the cutting height relative to the flail plate.

Figure 13:
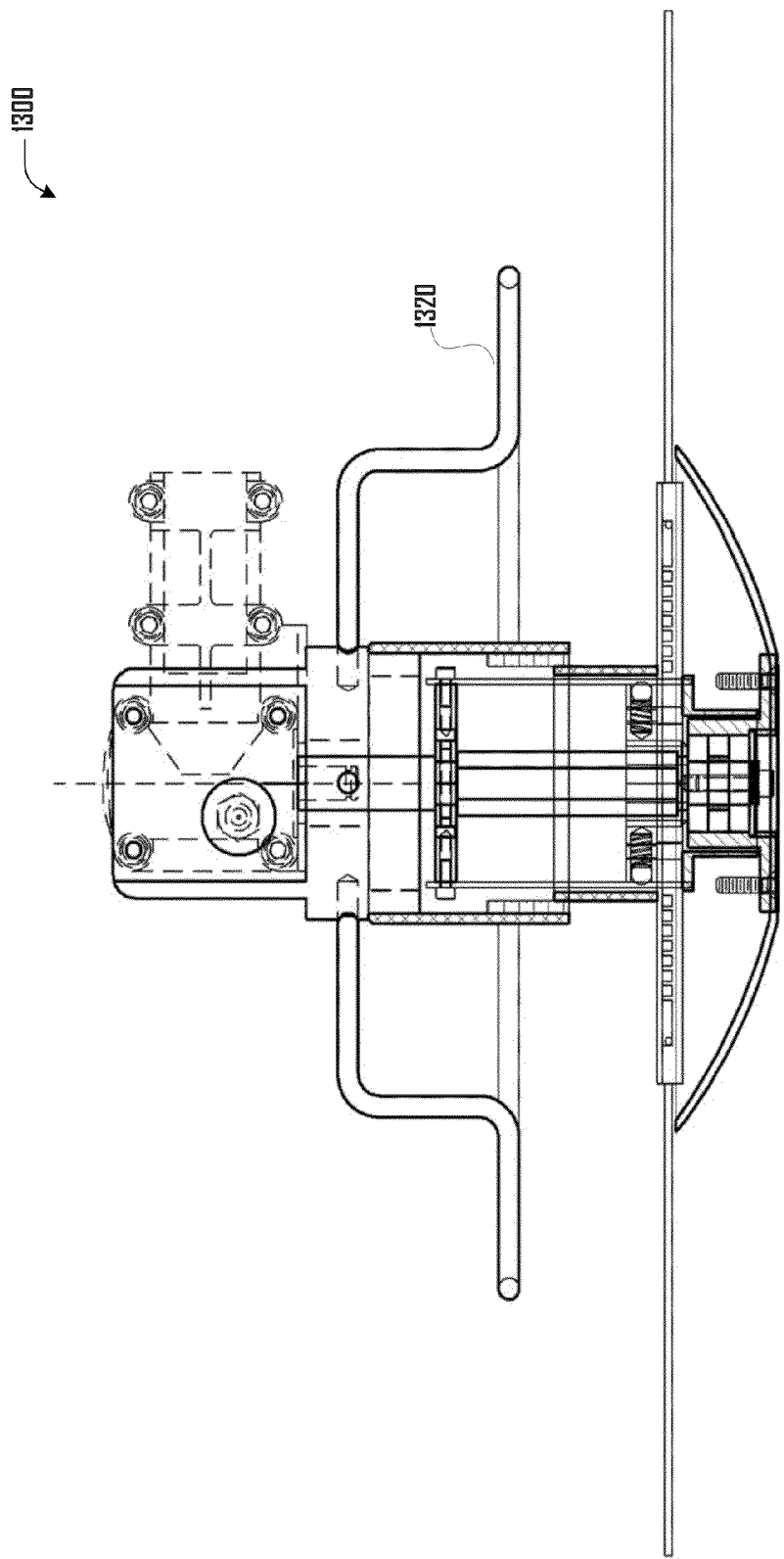
FIG. 13 is a flail spindle assembly with cutting flail in lower position having a lower guard assembly, in accordance with various embodiments.
Figure 14:
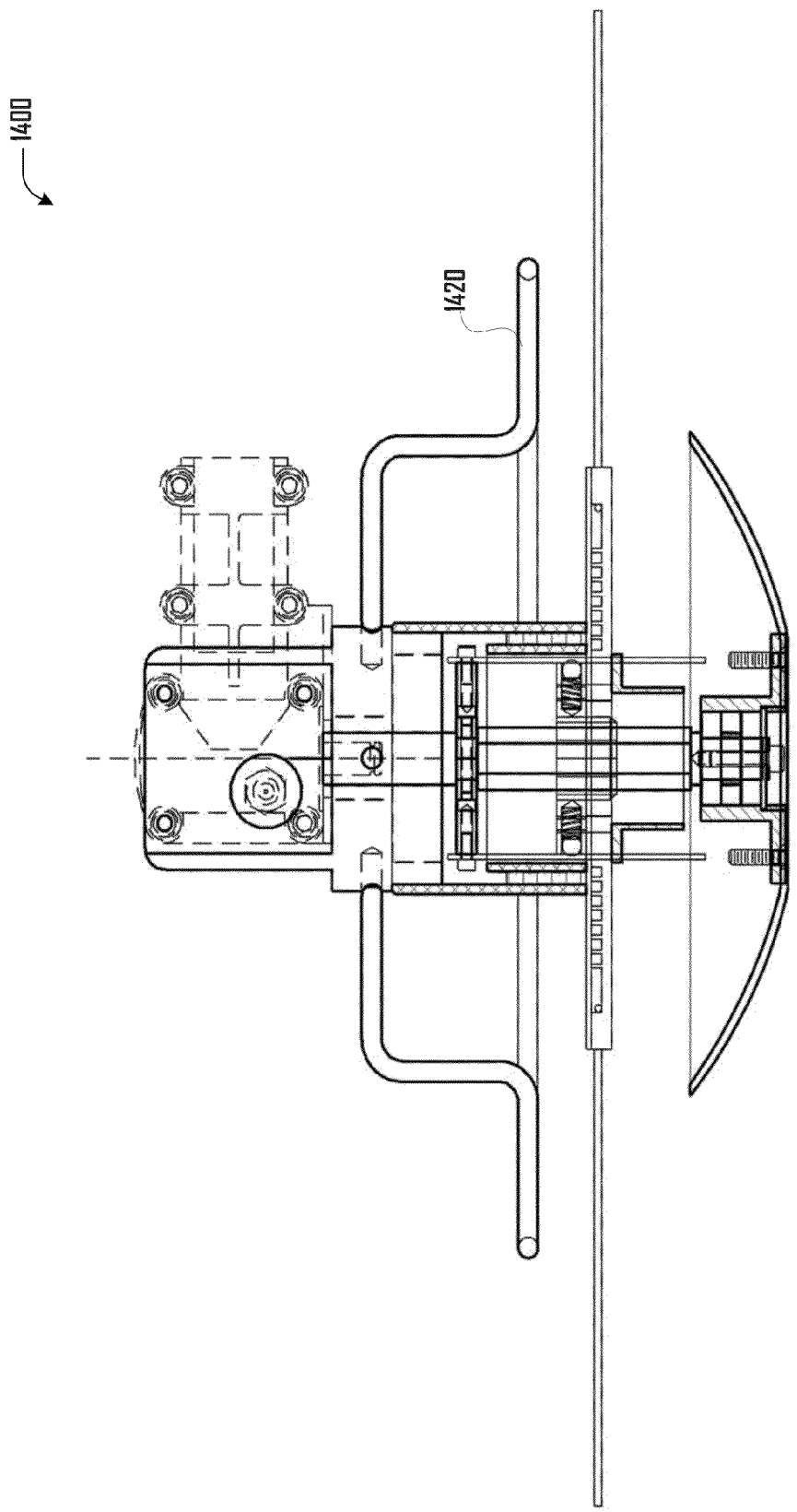
FIG. 14 is a flail spindle assembly with cutting flail in upper position having a lower guard assembly, in accordance with various embodiments.

Referring to FIG. 13, a flail spindle assembly 1300 with cutting flail in lower position having a lower guard assembly 1320 is shown in accordance with various embodiments. In various embodiments it may be useful to adjust the height of the flail guard 1320. Referring to FIG. 14, a flail spindle assembly 1400 with cutting flail in upper position having a lower guard assembly 1420 is shown in accordance with various embodiments.

Figure 15:
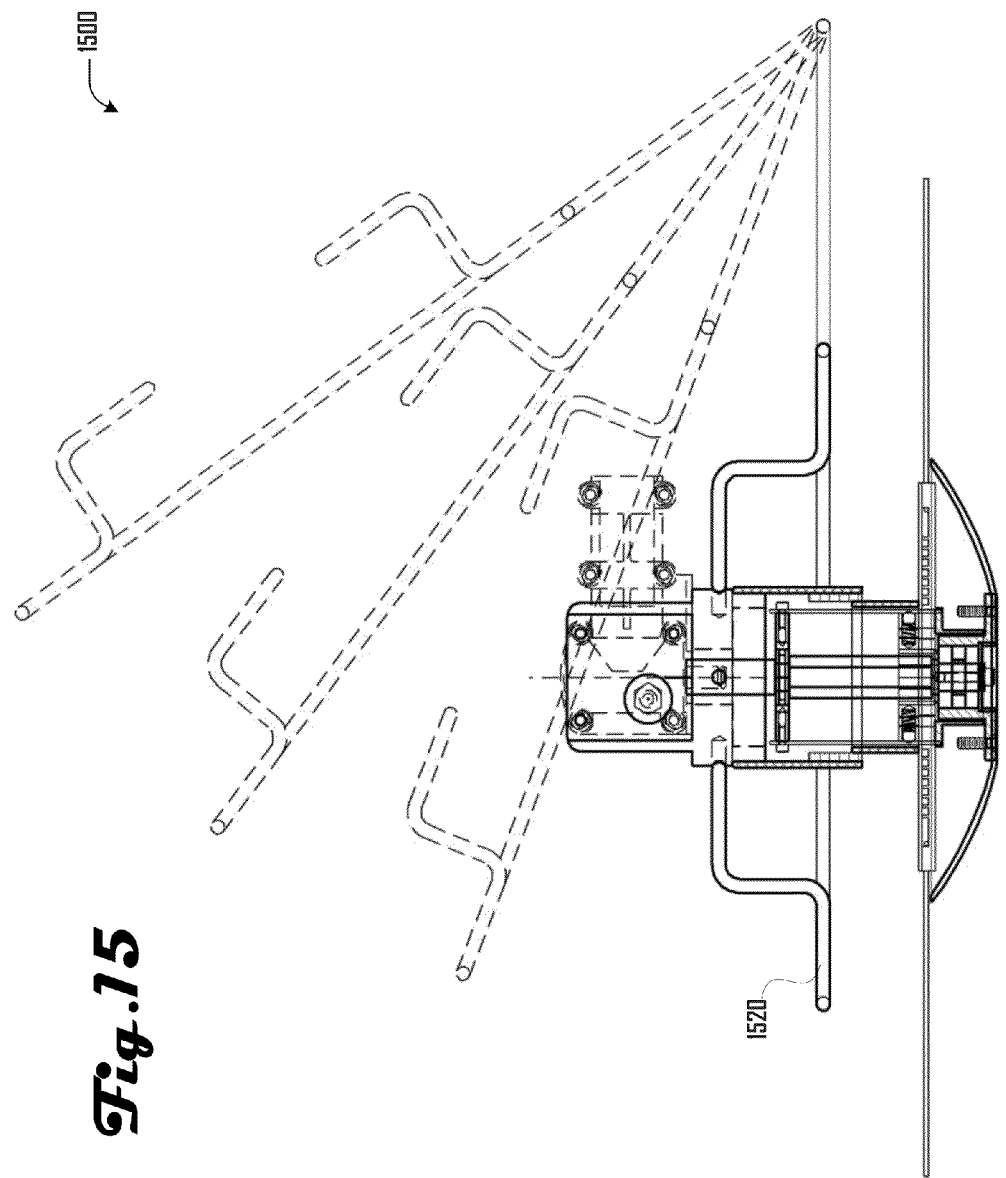
FIG. 15 is a flail spindle assembly with cutting flail in lower position having a pivotally attached guard assembly, in accordance with various embodiments.

Referring to FIG. 15, a flail spindle assembly 1500 with cutting flail in lower position having a pivotally attached guard assembly 1520 is shown in accordance with various embodiments. Referring to FIG. 16, a flail spindle assembly 1600 with cutting flail in upper position having a pivotally attached guard assembly 1620 is shown in accordance with various embodiments. The guard assembly (1520, 1620) are pivotally attached to the floating flail head chassis in a vertically pivotal manner to allow the said guard assembly to be relocated from the bumper function position to provide access to the spiral flail line storage head's adjustment features, and when moved from the bumper function position an electrical switch signals to shut down to default position all of the machines functions. More specifically, the trimmer device is deactivated to prevent the flail from rotating while working on the flail head.

Referring to FIG. 17A and FIG. 17B, side views and rear views of a drive chassis 1700 are shown in accordance with various embodiments. The drive chassis 1700 includes an over-arching frame and two traction wheels, each traction wheel having a different drive motor, 1776 and 1777. The drive chassis 1700 supports the power source (e.g., gasoline motor) and associated drive for the flail head. In one embodiment, the drive chassis 1700 is pivotally attached to the floating flail head chassis at approximately the midpoint of the drive chassis 1700. This pivotal connection, shown in FIG. 23 and in FIG. 5 as pivot point 540, allows for lateral rotation to reposition the flail head assembly to either side to better expose the flail beyond the wheel base, which is especially useful for trimming near vertical objects. a pivot point 540 This lateral rotation allows the device to maximize the cutting swath without losing traction or stability.

Figure 33A:
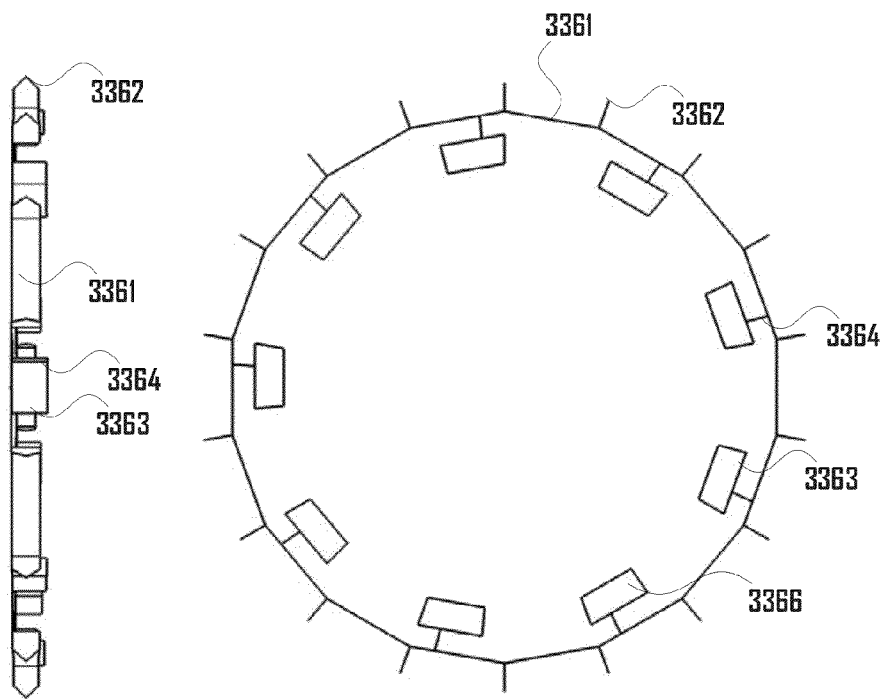
FIG. 33A illustrates front and side views of a traction wheel.
Figure 33B:
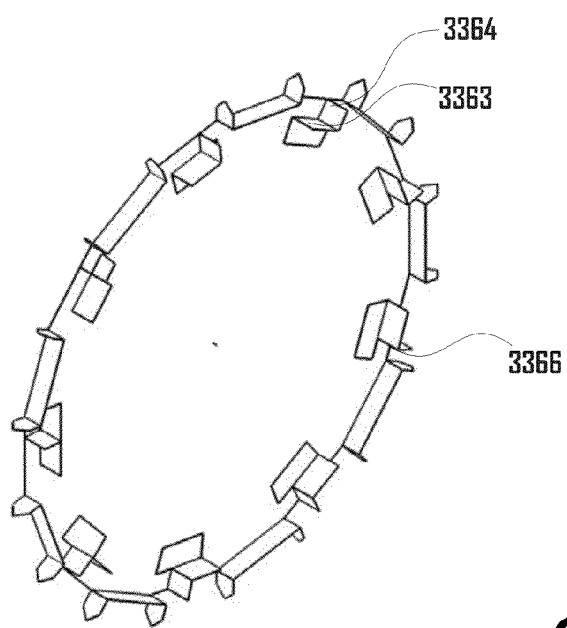
FIG. 33B is an isometric view of a traction wheel.

In one embodiment, the traction wheels have a large diameter relative to the overall height of the adverse terrain yard trimming apparatus. For example, traction wheels with a 12" diameter would be operational with a trimming apparatus having dimensions of 30" long×20" wide×13" high. As illustrated in FIGS. 33A and 33B, to provide better traction on a variety of surface conditions, the traction wheels, in one embodiment, have a circumferential surface including pointed penetration segments 3362, flat penetration stoppage segments 3361, secondary penetration stoppage segments 3363, and secondary paddles 3364. The pointed penetration segments widen from pointed entry points to a sufficient width to act as paddles when buried below the ground surface in loose material. In one embodiment, these pointed penetration segments may be spaced approximately 1.5 to 2.5 inches apart around a 12" diameter wheel. In one embodiment illustrated in FIGS. 33A and 33B, a flat penetration stoppage segment and a secondary penetration stoppage segment are positioned in sequence around the traction wheel, with the flat penetration stoppage segments being located along the outer circumference of the traction wheel and the secondary penetration stoppage segments being located along a radius closer to the center of the traction wheel. The flat penetration stoppage segment and secondary penetration stoppage segments are configured to prevent the traction wheel from sinking too far into the ground. This configuration facilitates better traction in various surfaces, such as hard ground cover, vegetative ground cover, and soft ground materials, like sand. In one embodiment, a disk of metal may be formed into a traction wheel by cutting outlines of pointed penetration segments, the flat penetration stoppage segments, the secondary penetration stoppage segments, and the secondary paddles, leaving uncut or leaving only partially cut (such as perforated) bend lines which connect the cut outlines to the disk of metal. The cut outlines may be bent along the uncut (or partially cut) bend lines, approximately 90 degrees to the plane of the disk of metal, with the pointed penetration segments and the secondary paddles being bent 90 degrees again relative to the flat penetration stoppage segments and the secondary penetration stoppage segments. Other techniques may be used to produce a traction wheel, such as injection molding a plastic or composite material. As illustrated in FIGS. 33A and 33B, the result is traction wheels comprising the foregoing portions as well as openings 3366.

In one embodiment, the traction wheels camber inward at the top by approximately 10 degrees from vertical. This camber allows for better clearance from vertical features to operate or trim next to walls, fences, trees, and the like. In one embodiment, the camber also creates a toe-in and toe-out traction wheel alignment change as the drive chassis 1700 pivots from forward and reverse. This camber adjustment of the alignment is due in part to a torsion adjustment of the trimmer as a result of the direction change and also helps facilitate weight adjustment. In one embodiment, weight distribution of the trimming device should be near equal, when measured forward and rearward of the center of the drive wheels. However, the cambering allows a small percentage of weight to be in front of the drive wheels depending on which direction the device is heading. The traction wheel alignment change also improves the traction wheels' grip on the ground surface. In one embodiment, the trimming apparatus adjusts the traction wheels so that whichever side of the device is leading, the traction wheel are realigned to be toe-out alignment in either the forward or backward direction. In one embodiment, the toe-in and toe-out realignment of may be up to 4 degrees for each wheel (total of 8 degrees).

As shown in FIG. 17A and FIG. 17B, the camber of the traction wheels is made possible in part by an over-arching frame. The over-arching frame captures wheel axles of each wheel on both sides to give the axles more strength. The over-arching frame also acts to synchronize movement of the traction wheels by connecting them. Although a balanced weight distribution enables ease of rotation of the trimmer, this does not always guarantee prevention of rollover in extreme conditions such as during side of hill operations. In these cases, the over-arching frame may also provide protection to the entire device in the event of a rollover by providing a roll bar cage on top for the gas motor and shielding the traction wheels. In addition, in various embodiments, the over-arching frame also provides a grip for lifting the trimming device.

Figure 18:
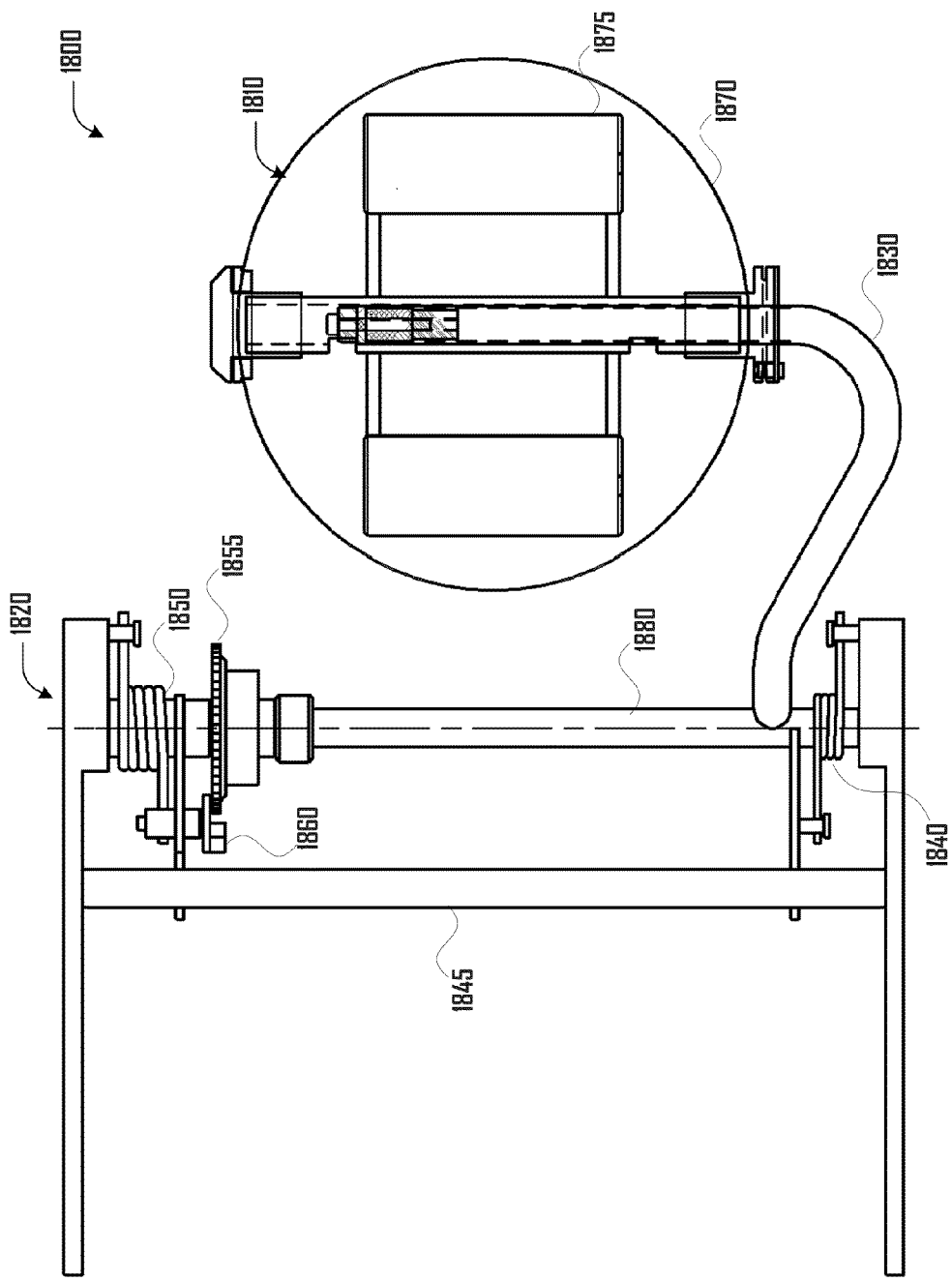
FIG. 18 is a top view of a stabilizing battery ball chassis in accordance with various embodiments.

Referring to FIG. 18, a top view of a stabilizing battery ball chassis 1800 is shown in accordance with various embodiments. The stabilizing battery ball chassis 1800 includes a removable spherical battery ball 1810, a torsional spring battery ball force transfer mechanism 1820, and a pivotable battery arm 1830. The battery ball force transfer mechanism 1820 or torsional spring system includes a first torsion spring 1840, a second torsion spring 1850, a one-way roller clutched wheel 1855, a pendulum latching pawl 1860, and a transverse frame member and torsion spring stop 1845. The first torsion spring 1840, the second torsion spring 1850, and the one-way roller clutched latch wheel 1855 are positioned along a lever arm pivot shaft 1880. In one embodiment, the second torsion spring 1850 is relatively stronger than the first torsion spring 1840 and engages when the pendulum latching pawl 1860 engages a square cornered notch on the clutched latch wheel 1855. In one embodiment, the wheel 1855 may include at least one of a one-way roller clutch, a spring wrapped one-way clutch, or other minimal backlash clutch. In the illustrated embodiment, the pivotable battery arm 1830 has an 'L' shape and provides an open ended horizontal axle shaft. The removable spherical battery ball 1810 is easily slid on and off of the axle shaft on the battery arm. The removable spherical battery ball having a battery pack 1875 electrically coupled to the trimming apparatus via the battery arm and a rotatable spherical shell 1870 that is physically coupled to the battery arm, the spherical shell being rotatable about an axis of a horizontal axle shaft of the battery arm 1830.

Figure 22:
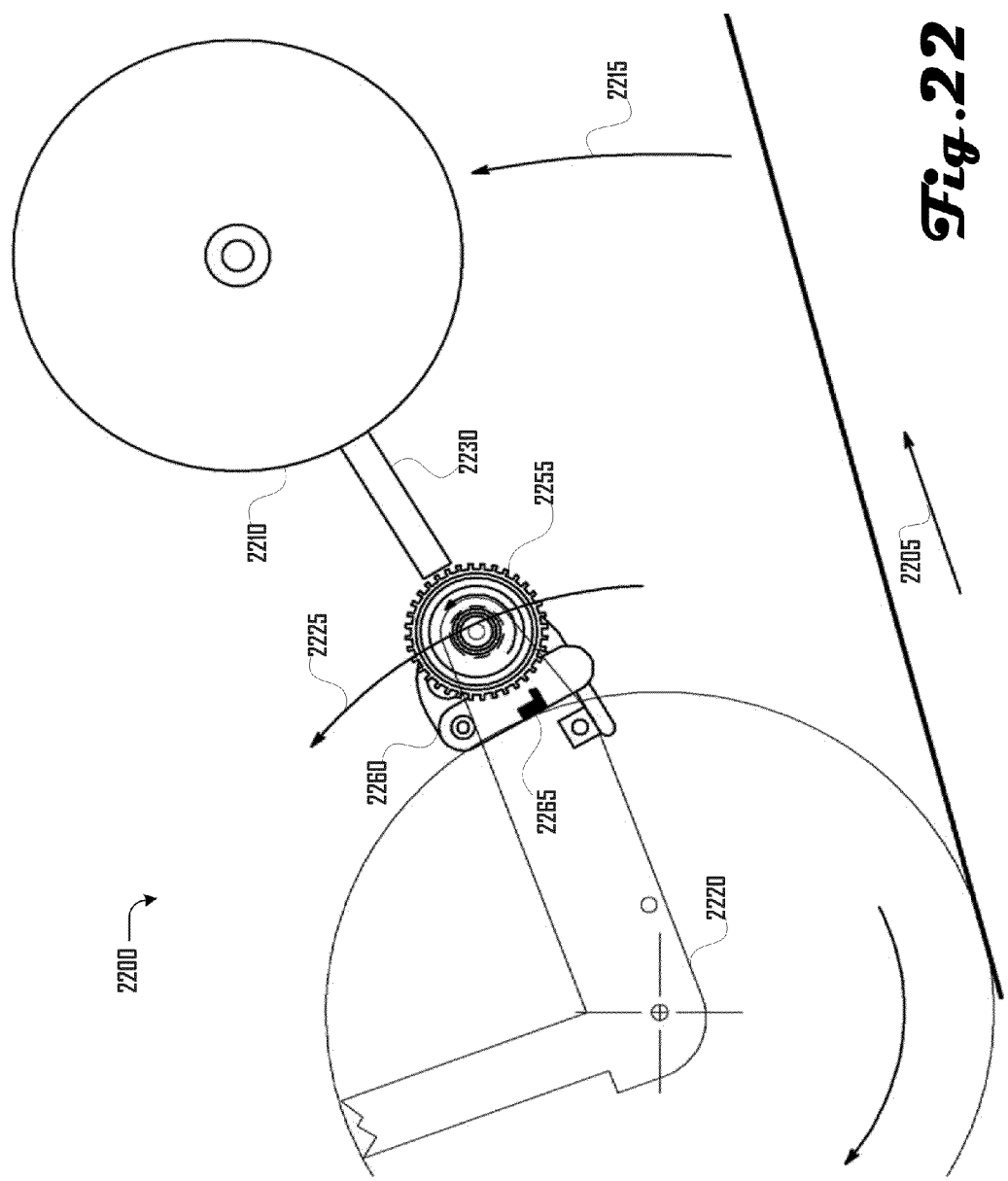
FIG. 22 is a side view of a stabilizing battery ball chassis moving uphill first in accordance with various embodiments.

As previously shown, the pivotable battery arm of the stabilizing battery ball chassis 1800 articulates relative to the rest of the trimmer to conform to adverse surface conditions. The stabilizing battery ball chassis 1800 also helps stabilize the trimmer when the trimming apparatus accelerates and/or climbs a steep slope in a forward direction (with the flail head chassis proceeding first). In the forward direction, the stabilizing battery ball chassis 1800 provides an anti-tilt wheel to prevent the flail from lifting off the ground surface when accelerating or climbing a steep slope in the forward direction. FIG. 22 is a side view of a stabilizing battery ball chassis moving uphill in a reverse direction (with the battery ball chassis proceeding first) in accordance with various embodiments. As shown, in one embodiment, the pivotable battery arm lifts the spherical battery ball off the ground surface when operating in a reverse direction. More importantly, in the reverse direction the weight of the battery ball is added to the wheels to improve reverse motion traction. Lifting the spherical battery ball off the ground also protects the battery ball from hitting objects when it is in front, relative to the direction of motion.

Figure 20:
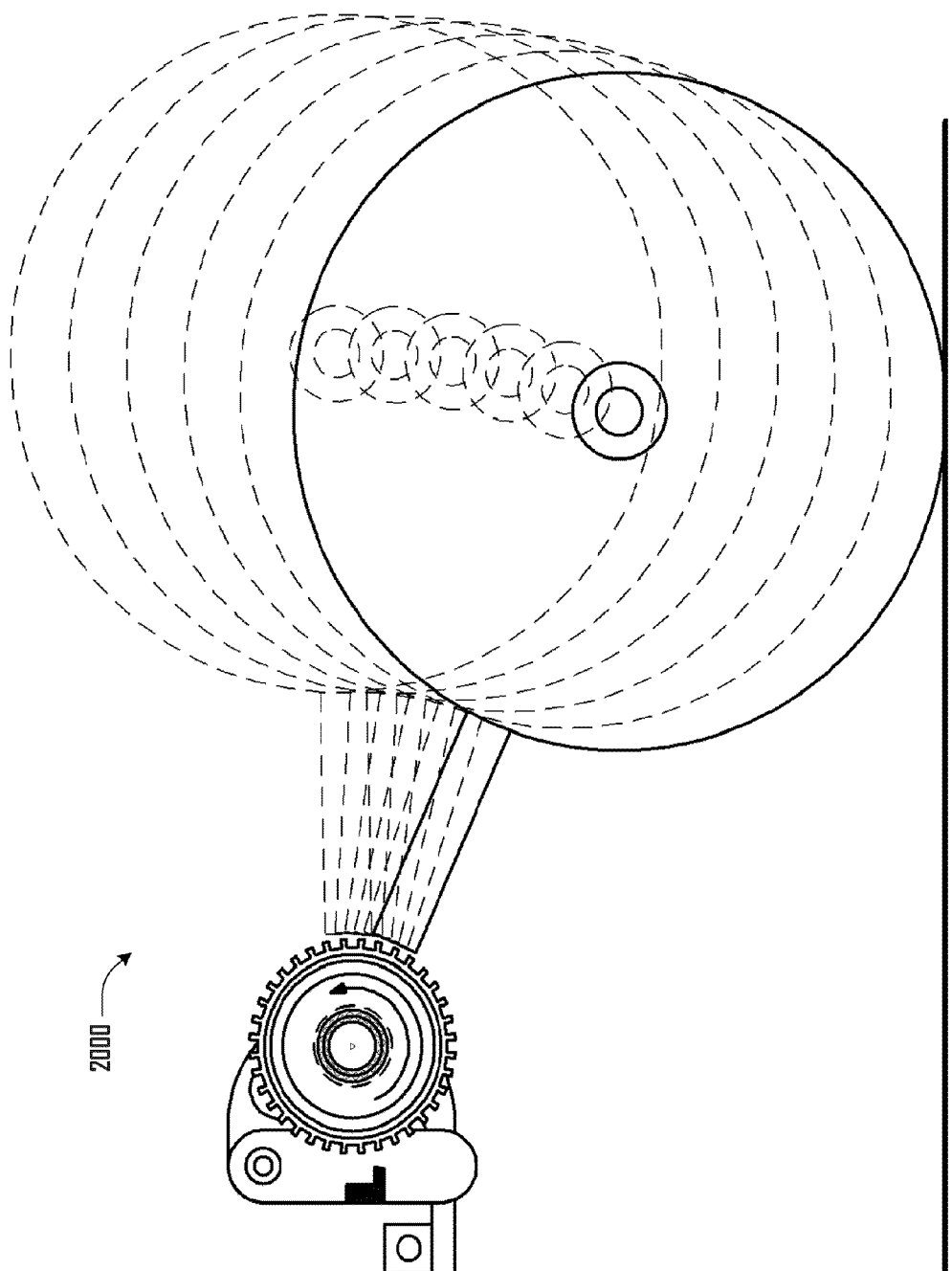
FIG. 20 is a side view illustrating possible articulation of a stabilizing battery ball chassis in accordance with various embodiments.

In one embodiment, the stabilizing battery ball chassis 1800 is pivotally restrained at a connection point on the drive chassis by a torsion spring system. However, other springs may be used including extension springs and/or compression springs. The illustrated torsion system includes a dual torsion spring system, having a first torsion spring and a second torsion spring, relatively stronger than the first torsion spring. If the terrain remains neutral in nature, where the ground is essentially level, the stabilizing battery ball chassis articulates relative to the terrain and acceleration of the trimmer. FIG. 20 is a side view illustrating possible articulation of a stabilizing battery ball chassis in a neutral operating condition in accordance with various embodiments. In this configuration the pendulum latching pawl of the torsion spring system hangs free and only the first torsion spring is resisting rotation of the battery ball lever arm.

In one embodiment, when the trimmer encounters adverse terrain with a steep slope the second spring is engaged to increase resistance and keep the flail head assembly close to the ground surface. In this operating environment the second torsion spring is engaged to provide additional assistance in to the torque reaction provided by the first spring alone. The steep slope triggers activation of a battery ball clutch transfer mechanism in the torsion spring system. FIG. 19A and FIG. 19A are side views of one such battery ball clutch transfer mechanism 1900 in accordance with various embodiments. In FIG. 19A, the slope is not too steep so that the pendulum latching pawl 1960 has not engaged a square cornered notch on the one-way roller clutch wheel 1955. In FIG. 19B, the slope exceeds a neutral operating condition (e.g., greater than 15 degrees) and the pendulum latching pawl 1960 engages any of the square cornered notches of the one-way roller clutch wheel 1955 which adds the second torsion spring to the first torsion spring. In one embodiment, if both the first and second torsion stages of resistance are overcome and the rotation of the drive chassis hits the stop point of a rotation limiting slot (the rotation limiting slot illustrated, for example, at element 752 of FIG. 7), the weight of the flail head assembly is repositioned in front of the traction wheel contact point on the ground surface to further enhance traction.

Figure 21:
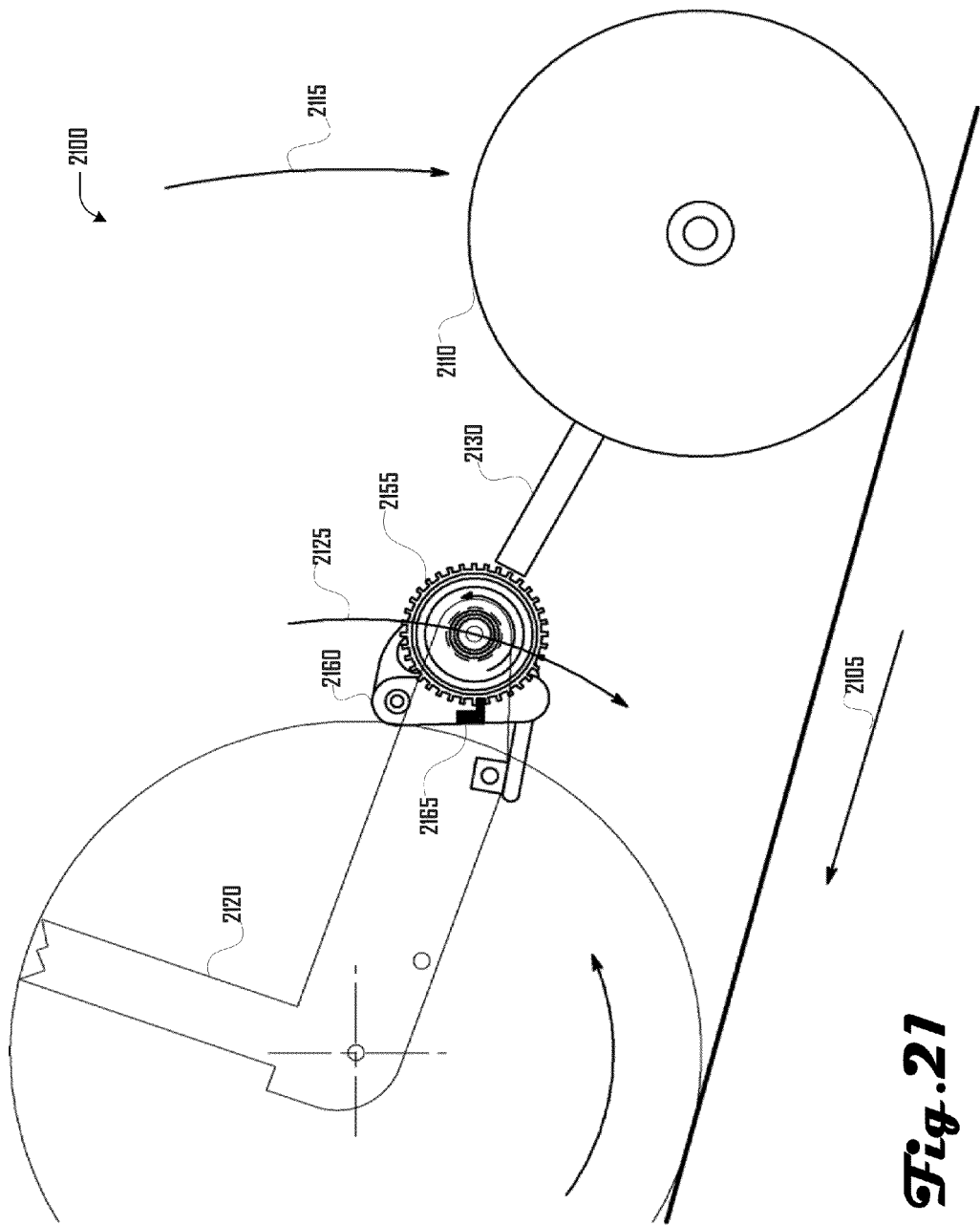
FIG. 21 is a side view of a stabilizing battery ball chassis moving uphill last in accordance with various embodiments.

Referring now to FIG. 21, a side view of a stabilizing battery ball chassis moving uphill last is shown in accordance with various embodiments. In one embodiment, if the trimmer is going up a hill with a slope of at least 15 degrees, the trimmer flail head first, the pendulum latching pawl has engaged in a notch on the one-way roller clutch wheel allowing a second torsion spring to join the first torsion spring in resisting articulation of the battery ball lever arm. When the second torsion spring joins to resist rotation of the battery ball lever arm, the pendulum pawl is engaged in the square cornered notch of the one-way roller clutch wheel, keeping it from rotation in either direction. This locked-in-place roller clutch wheel allows the battery ball lever arm to find the lowest possible angle to keep the cutting head on the ground.

Figure 24:
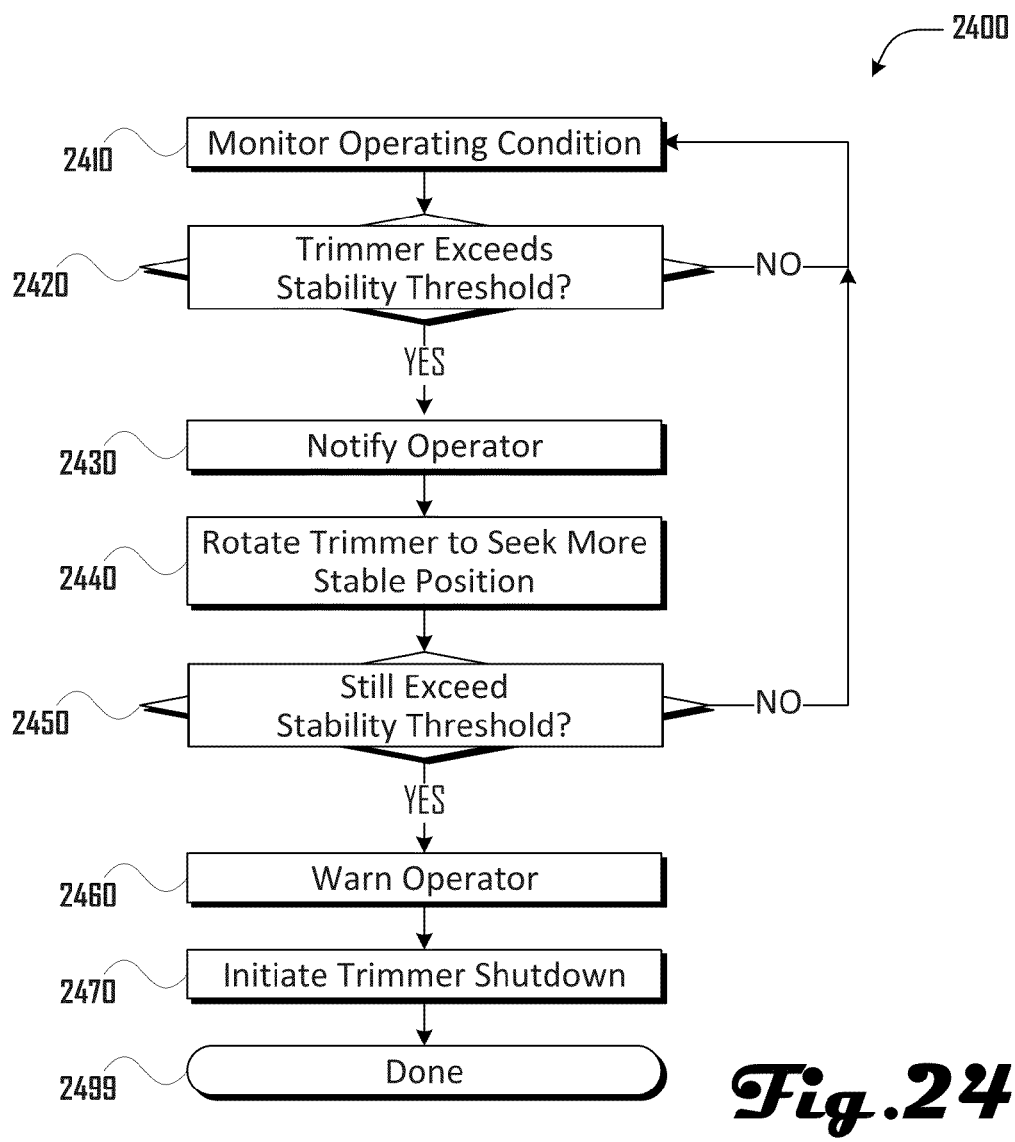
FIG. 24 is a flow diagram illustrating a stabilization routine for an adverse terrain trimmer in accordance with various embodiments.

Referring now to FIG. 24, a flow diagram illustrating stabilization routine 2400 for use with an adverse terrain trimmer is shown in accordance with various embodiments. In one embodiment, the stabilization routine 2400 monitors the operating conditions of the adverse terrain trimmer using information collected by the previously described stabilization component 340. In query box 2420, routine 2400 detects instability in the trimming apparatus due to adverse terrain. In one embodiment, routine 2400 may detect instability by monitoring operating conditions of the trimming apparatus and determining when operating conditions of the trimming apparatus exceeds a stability threshold. In one embodiment, the stability threshold of the trimming apparatus is determined in part by a slope of the adverse terrain surrounding the trimming apparatus compared relative to a center of gravity and a weight of the trimming apparatus.

Upon detecting potential instability, routine 2400 may notify the operator in box 2430. Notification may occur in a variety of ways including audible and visual alarms. For example, in one embodiment, a warning light and/or an audible noise may be emitted from the controller. Other embodiments may activate a visible warning light on the trimming device. In box 2440, the stabilization routine 2400 rotates the trimmer to seek a more stable position. In one embodiment, rotating includes spinning around a central axis of the trimming apparatus into one of an uphill position, a downhill position, or a position perpendicular to the uphill position or the downhill position. Typically this rotation to reach one of these positions is less than about 45 degrees. In one embodiment, if stabilization routine 2400 still detects instability in query block 2450 after rotation, then stabilization routine 2400 provides a final warning to the operator in block 2460 and initiates trimmer emergency shutdown in block 2470.

Figure 25:
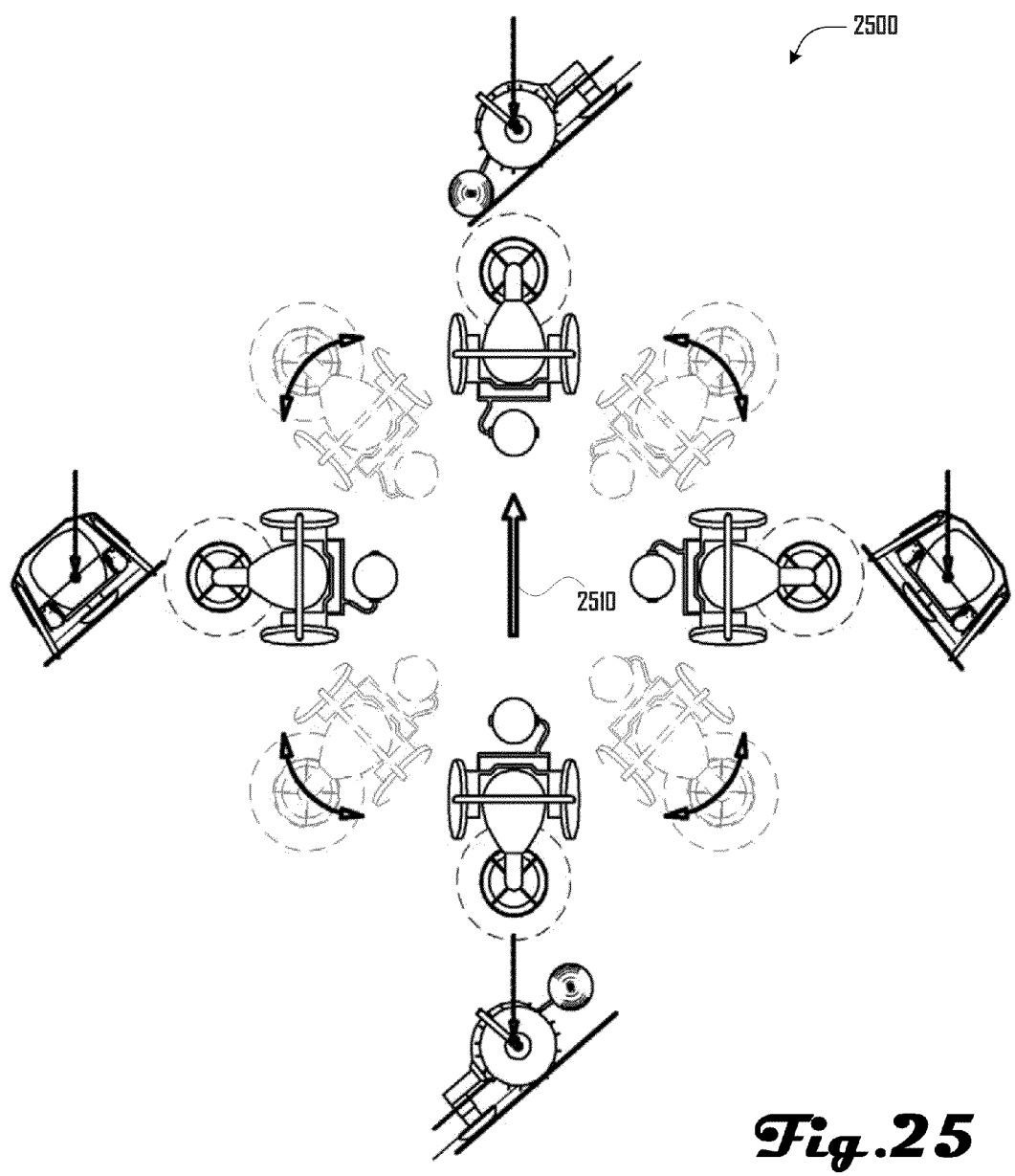
FIG. 25 illustrate a top view and a side view of an adverse terrain trimmer in various operating positions relative to an uphill slope in accordance with various embodiments.

Referring now to FIG. 25, the inner circle provides representative top views and the outer circle provides representative side views of an adverse terrain trimmer 2500 in accordance with various embodiments. The top and side views are shown in each of four desired stable operating positions relative to an uphill direction 2510 of the slope. In one embodiment, the four desired stable operating positions include uphill and downhill positions, which are both parallel to the uphill direction 2510 and right-facing and left facing positions, which are perpendicular to the uphill direction 2510. Accordingly, FIG. 25 also shows possible ranges for at least four potentially instable operating positions, each potentially instable operating position is between two of the desired stable operating positions. As previously discussed in FIG. 24, upon detecting instability a stabilization routine 2400 may direct the trimmer 2500 to seek a more stable operating position. In one embodiment, the trimmer 2500 rotates to the more stable operating position. FIG. 25 also illustrates at least one stability threshold for the trimming apparatus in each of the side views. In one embodiment, the stability threshold may be determined in part by a slope of the trimming device on the adverse terrain (determined relative to either a horizontal or vertical plane of the gravitation field) compared relative to the geometry, mass, and mass-density distribution of the device, considering factors such as the device's center of mass, wheel base, base including wheels, flail head, and battery ball, distance between components, mass and density of components, and similar. The stability threshold may be determined theoretically and/or by testing an embodiment and establishing a fixed stability threshold based on the tests. In one embodiment, when either the flail plate or the spherical battery ball are on the ground, a stability threshold of the trimming apparatus may be determined in part by comparing the slope of the adverse terrain and/or the angle of the trimming apparatus relative to the gravitational field against a triangular stability threshold associated with the triangular support structure consisting of each of the two traction wheels and at least one of the flail head plate and/or the battery ball. In one embodiment, the stability threshold may be determined in part by comparing the slope of the adverse terrain and/or the angle of the trimming apparatus relative to the gravitational field against a dual triangular stability threshold or diamond stability threshold of the trimming apparatus associated with the support structure consisting of each of the two traction wheels and both the flail head plate and the battery ball. In one embodiment, the stability threshold may occur when the trimmer obtains an angle (such as due to slope of the ground) of forty to forty-seven degrees relative to the horizontal plane.

Figure 26:
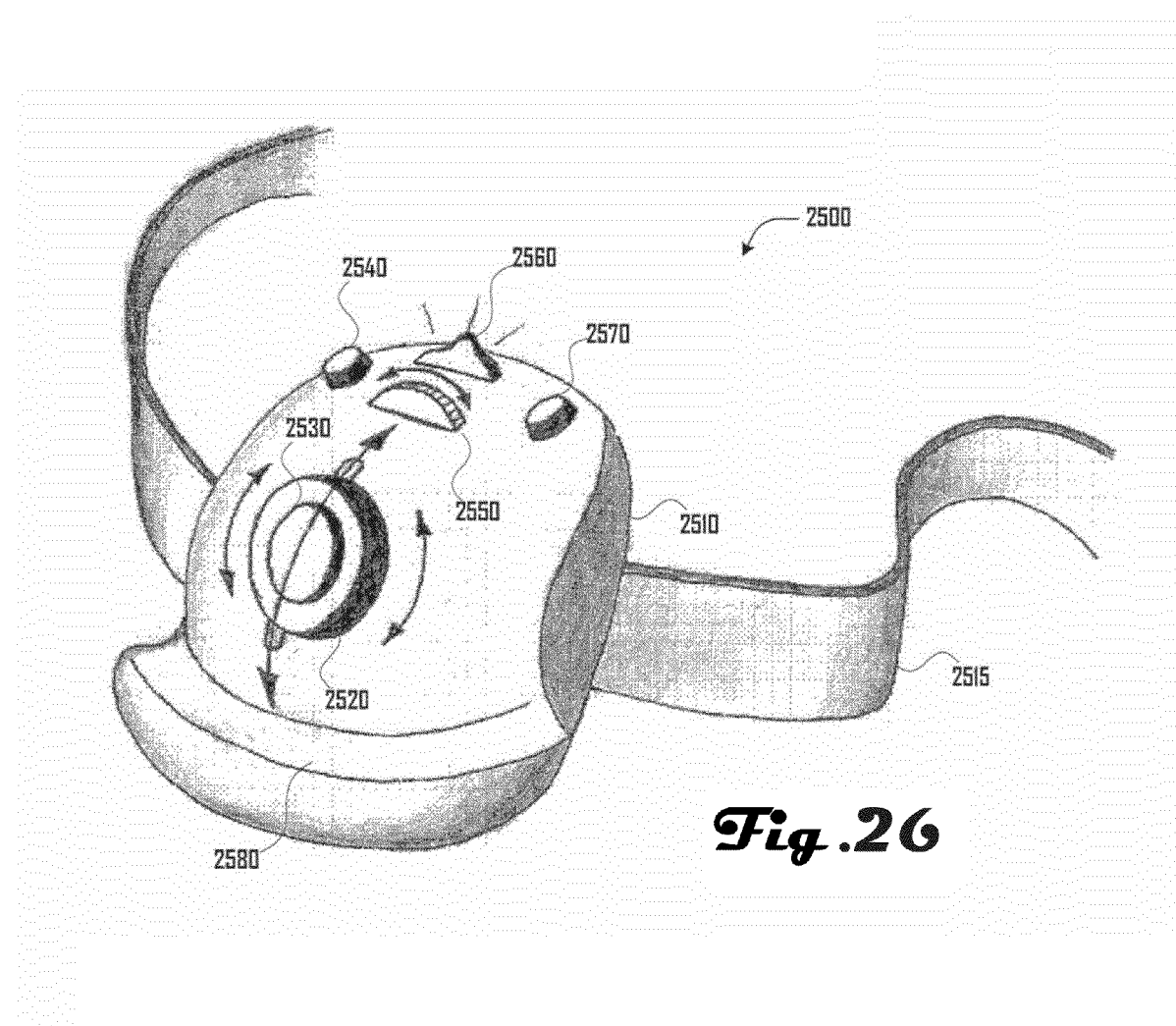
FIG. 26 a perspective view of a multi-channel remote controller device, in accordance with various embodiments.

Referring now to FIG. 26, a perspective view of several components of a multi-channel remote controller 2600 is shown in accordance with various embodiments. The illustrated multi-channel remote controller 2600 has a housing 2610 configured to be selectively detachable from a belt 2615 and ergonomically customized to provide an operator with a hand support 2680 and control knobs that allow safe operation with a single hand. The control knobs include a steering knob 2620 for forward and reverse and right and left steering, and emergency stop button 2630, a momentary motor start ignition button 2640, a throttle adjustment knob 2650, a variable throttle signal adjustment 2660, and a momentary solenoid latch release 2670. In one embodiment, rotating the steering knob 2620 clockwise or counterclockwise steers the trimmer left or right. Moving the steering knob up and/or down along the vertical slot allows the trimmer to move forward or reverse. Alternatively, in one embodiment, the vertical slot could be rotated to horizontal so that the knob could move forward and backward along the control slot. Rotating the steering knob 2620 without moving it out of the center neutral position causes the trimmer to rotate about its center point between the two drive wheels. Any forward or backward control applied while also rotating the steering knob applies a mix of turning rotation and motion. In one embodiment, these control signals are mixed by an electronic motor speed controller on the trimmer. The linear sliding or tilting of the steering knob 2620 and turning of the steering knob 2620 make the blending of steering and forward and reverse movements less demanding on the operator. Accordingly, in another embodiment, the same or similar motions may be acquired using a standard Hobby joystick interface.

Figure 27:
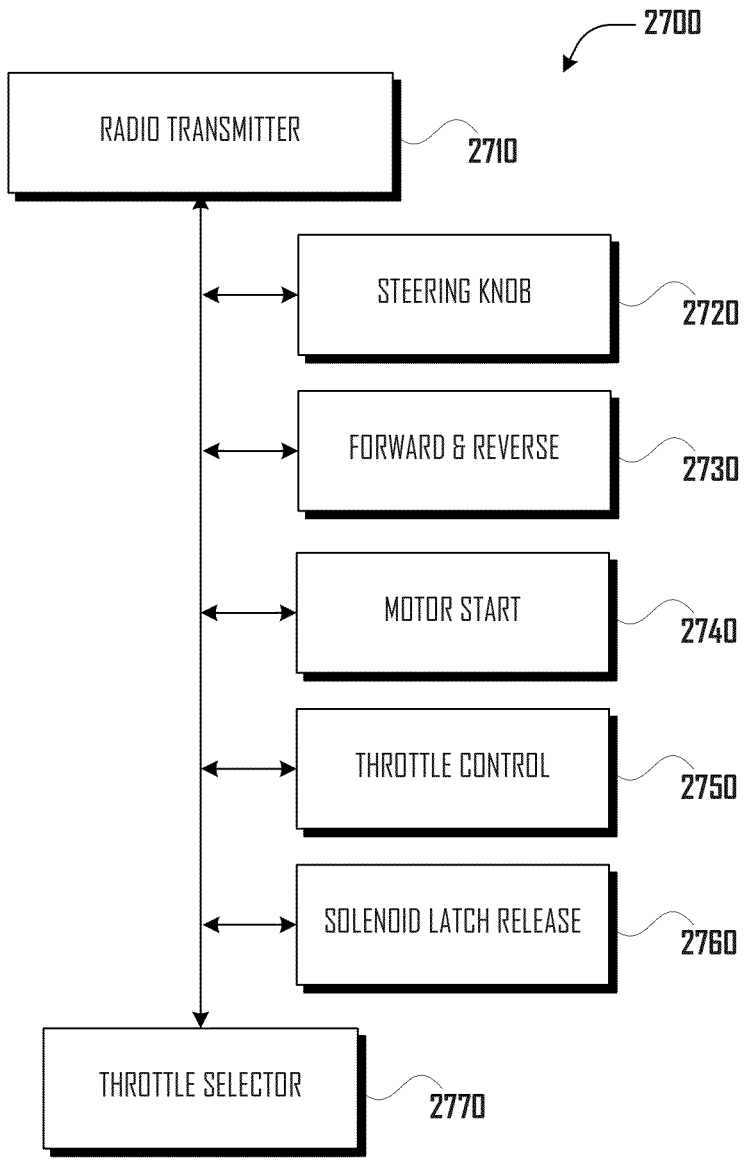
FIG. 27 is a block diagram of a multi-channel remote controller device, in accordance with various embodiments.

Referring now to FIG. 27, a block diagram view of several components of a multi-channel remote controller 2700 are shown in accordance with various embodiments. The multi-channel remote controller 2700 includes a radio transmitter 2710, a steering knob 2720, a forward and reverse control 2730, a motor start control 2740, a throttle control 2750, a solenoid latch release 2760, and a throttle selector 2770. In one embodiment, radio transmitter 2710 is conventional hobby level spread spectrum radio transmitter. Although a conventional hobby level spread spectrum radio transmitter and receiver can provide acceptable performance, as previously indicated other wireless communication may also be employed. Exemplary wireless communication includes digital, microwave, wifi, cellular, infrared, ultrasonic, Radio Frequency (RF), and other wireless remote control and telemetry communication methods. In addition to the steering knob 2620 previously shown in FIG. 26, the steering knob 2720 may alternatively be a joystick, steering wheel, or other touch sensitive knob operated as a steering mechanism. In one embodiment, the remote controller 2700 optionally includes a speaker and warning lights to provide operational warning signals.

Figure 28:
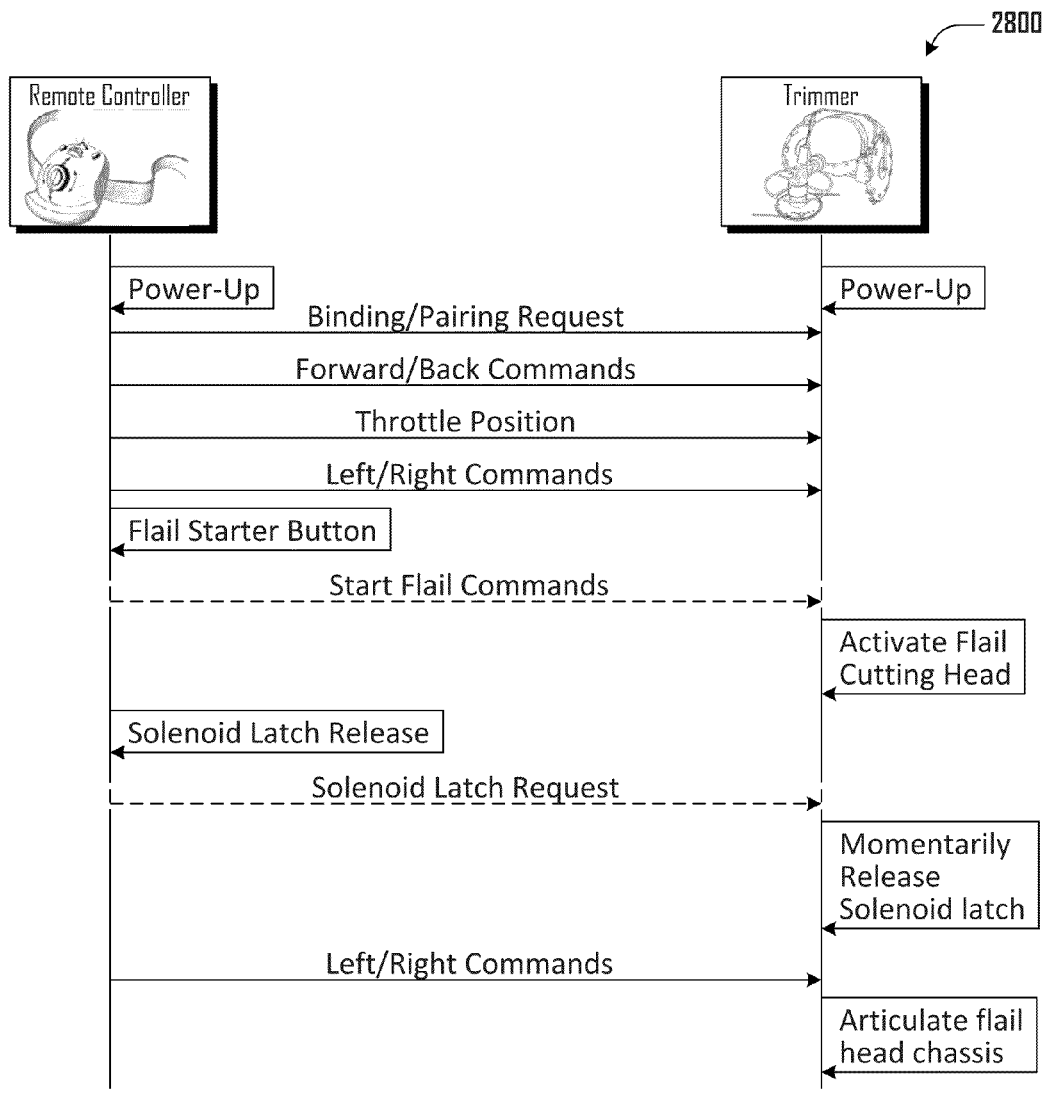
FIG. 28 is a communication diagram of a multi-channel remote controller device with an adverse terrain remote control trimmer device in accordance with various embodiments.
Figure 29:
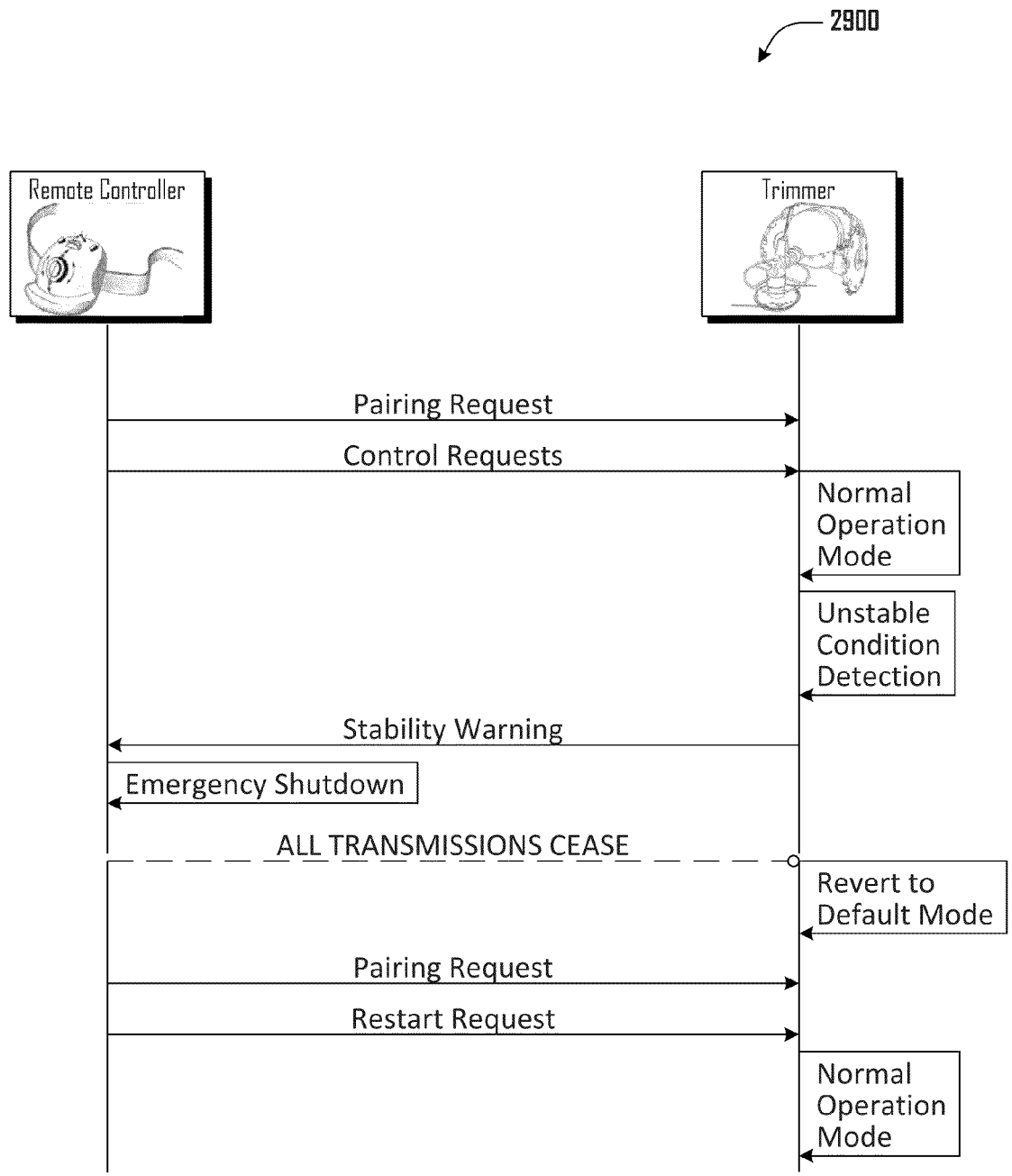
FIG. 29 is a communication diagram of an emergency stop in accordance with various embodiments.

FIG. 28 is a communication diagram of a multi-channel remote controller device with an adverse terrain remote control trimmer device in accordance with various embodiments and FIG. 29 are communication diagrams of a remote controller device with an adverse terrain remote control trimmer device in accordance with various embodiments. In particular, FIG. 28 is a communication diagram 2800 of a multi-channel remote controller device with an adverse terrain remote control trimmer device showing multiple control channels. FIG. 29 is a communication diagram 2900 of a multi-channel remote controller device with an adverse terrain remote control trimmer device showing an emergency shutdown in accordance with at least one embodiment.

Additionally, although specific embodiments have been illustrated and described herein, it will be appreciated by those of ordinary skill in the art and others, that a wide variety of alternate and/or equivalent implementations may be substituted for the specific embodiments shown and described without departing from the scope of the embodiments described herein. This application is intended to cover any adaptations or variations of the embodiments discussed herein. While various embodiments have been illustrated and described, as noted above, many changes can be made without departing from the spirit and scope of the embodiments described herein.

The invention claimed is:

1. A spiral flail line storage head comprising:
   a spiral channel plate comprising at least a first spiral channel for a first trimmer line, said channel comprising a smooth inner channel wall and a rough outer channel wall;
   a trimmer line egress in the first spiral channel, said trimmer line egress comprises a curved edge and a recoil space; and
   a latch to engage with the first trimmer line.

2. The spiral flail line storage head according to claim 1, wherein the spiral channel plate further comprises a second spiral channel for a second trimmer line.

3. The spiral flail line storage head according to claim 2, wherein the spiral channels are configured as at least one of archimedean spirals, equilateral spirals, and three-dimensional spirals, which spiral channels spiral in toward the center of the spiral channel plate.

4. The spiral flail line storage head according to claim 1, further comprising at least a first retaining plate on one side of the spiral channel plate.

5. The spiral flail line storage head according to claim 4, wherein the retaining plate may be removed to allow the first trimmer line to be loaded into the spiral channel plate.

6. The spiral flail line storage head according to claim 1, wherein the trimmer line egress comprises an entrance defined by the curved edge and a margin of the recoil space, said entrance is wider than an interior of the spiral channel.

7. The spiral flail line storage head according to claim 1, wherein when the spiral flail line storage head rotates about its central axis, the first trimmer line is forced outward by centrifugal force into a radial position relative to the spiral channel plate.

8. The spiral flail line storage head according to claim 1, wherein when the latch is engaged, the latch pinches the trimmer line within the spiral channel.

9. The spiral flail line storage head according to claim 1, further comprising a trimmer to which the spiral flail line storage head is secured.

* * * * *